(12) United States Patent
Masamura

(10) Patent No.: US 10,076,943 B2
(45) Date of Patent: Sep. 18, 2018

(54) SUSPENSION DEVICE

(71) Applicant: KYB Corporation, Tokyo (JP)

(72) Inventor: Tatsuya Masamura, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/523,691

(22) PCT Filed: Nov. 6, 2015

(86) PCT No.: PCT/JP2015/081387
§ 371 (c)(1),
(2) Date: May 2, 2017

(87) PCT Pub. No.: WO2016/072510
PCT Pub. Date: May 12, 2016

(65) Prior Publication Data
US 2017/0313153 A1    Nov. 2, 2017

(30) Foreign Application Priority Data

Nov. 7, 2014   (JP) .................................. 2014-226734

(51) Int. Cl.
*B60G 17/056*   (2006.01)
*B60G 13/08*   (2006.01)

(52) U.S. Cl.
CPC .......... *B60G 17/056* (2013.01); *B60G 13/08* (2013.01); *B60G 2400/5182* (2013.01); *B60G 2500/114* (2013.01); *B60G 2600/26* (2013.01)

(58) Field of Classification Search
CPC .................. B60G 17/056; B60G 13/08; B60G 2400/5182; B60G 2500/114; B60G 2600/26
See application file for complete search history.

(56) References Cited

U.S. PATENT DOCUMENTS 5,682,968 A * 11/1997 Boichot ............. B60G 17/0152
188/266.2
6,405,750 B1   6/2002 Rogala
(Continued)

FOREIGN PATENT DOCUMENTS

JP     H05-65012 A    3/1993
JP     H05-139136 A   6/1993
(Continued)

*Primary Examiner* — Faye M Fleming
(74) *Attorney, Agent, or Firm* — Rabin & Berdo, P.C.

(57) ABSTRACT

A suspension device includes: a damper that has an extension-side chamber and a contraction-side chamber; an extension-side passage connected to the extension-side chamber; a contraction-side passage connected to the contraction-side chamber; a switching device that connects one of the extension-side passage and the contraction-side passage to the supply passage and connecting the other of the extension-side passage and the contraction-side passage to the discharge passage selectively; an extension-side damping element provided in the extension-side passage; a contraction-side damping element provided in the contraction-side passage; a control valve capable of adjusting a pressure in the supply passage; an intake check valve provided midway in the intake passage; and a supply-side check valve provided in the supply passage between the control valve and the pump.

16 Claims, 9 Drawing Sheets

(56) References Cited

U.S. PATENT DOCUMENTS

| | | | | |
|---|---|---|---|---|
| 7,143,875 B2* | 12/2006 | Matsunaga | ........ | B60G 17/0152 |
| | | | | 188/266.5 |
| 7,735,838 B2* | 6/2010 | Rades | ................ | B60G 17/0162 |
| | | | | 280/5.507 |
| 2011/0187065 A1 | 8/2011 | Van Der Knaap et al. | | |
| 2017/0320368 A1* | 11/2017 | Masamura | ........... | B60G 17/015 |

FOREIGN PATENT DOCUMENTS

| JP | H09-240241 A | 9/1997 |
|---|---|---|
| JP | 2004-515726 A | 5/2004 |
| JP | 2011-530451 A | 12/2011 |

\* cited by examiner

SUSPENSION DEVICE

TECHNICAL FIELD

The present invention relates to a suspension device.

BACKGROUND ART

A device that functions as an active suspension interposed between a vehicle body and an axle of a vehicle, for example, is available as a suspension device. More specifically, this suspension device is configured to include: a suspension main body having a cylinder, a piston that is inserted into the cylinder to be free to move and defines a pressure chamber within the cylinder, and a rod coupled to the piston; a hydraulic pump; an oil passage that connects the pressure chamber in the suspension main body to the hydraulic pump; a solenoid open/close valve provided midway in the oil passage in order to open and close the oil passage; a solenoid pressure control valve that controls the pressure in the pressure chamber; and a solenoid failsafe valve for performing a fail operation when a system failure occurs (see JPH9-240241A, for example).

SUMMARY OF INVENTION

In a suspension device that functions as an active suspension, such as that described above, a problem occurs in that the hydraulic pump must be driven constantly during control, leading to an increase in energy consumption.

The present invention has been designed to solve this problem, and an object thereof is to provide a suspension device that consumes less energy.

According to one aspect of the present invention, a suspension device includes: a damper that has a cylinder and a piston that is inserted into the cylinder to be free to move and defines an extension-side chamber and a contraction-side chamber within the cylinder; a pump; a reservoir connected to an intake side of the pump; a supply passage connected to a discharge side of the pump; a discharge passage connected to the reservoir; an extension-side passage connected to the extension-side chamber; a contraction-side passage connected to the contraction-side chamber; a switching device that connects one of the extension-side passage and the contraction-side passage to the supply passage and connecting the other of the extension-side passage and the contraction-side passage to the discharge passage selectively; an extension-side damping element provided in the extension-side passage to apply resistance to a flow traveling from the extension-side chamber toward the switching device and permit a flow traveling in an opposite direction; a contraction-side damping element provided in the contraction-side passage to apply resistance to a flow traveling from the contraction-side chamber toward the switching device and permit a flow traveling in an opposite direction; a control valve capable of adjusting a pressure in the supply passage in accordance with a supplied current; an intake passage that connects the supply passage to the discharge passage; an intake check valve provided midway in the intake passage in order to permit only a flow of fluid traveling from the discharge passage toward the supply passage; and a supply-side check valve provided in the supply passage between the control valve and the pump in order to permit only a flow traveling from the pump side toward the control valve side.

According to another aspect of the present invention, a suspension device includes: a plurality of dampers, each having a cylinder and a piston that is inserted into the cylinder to be free to move and defines an extension-side chamber and a contraction-side chamber within the cylinder; a pump; a reservoir connected to an intake side of the pump; a plurality of fluid pressure circuits provided respectively for the dampers; and a flow dividing valve that distributes fluid discharged from the pump to the respective fluid pressure circuits, each fluid pressure circuit comprising: a supply passage connected to a discharge side of the pump via the flow dividing valve; a discharge passage connected to the reservoir; an extension-side passage connected to the extension-side chamber; a contraction-side passage connected to the contraction-side chamber; a switching device that connects one of the extension-side passage and the contraction-side passage to the supply passage and connecting the other of the extension-side passage and the contraction-side passage to the discharge passage selectively; an extension-side damping element provided in the extension-side passage to apply resistance to a flow traveling from the extension-side chamber toward the switching device and permit a flow traveling in an opposite direction; a contraction-side damping element provided in the contraction-side passage to apply resistance to a flow traveling from the contraction-side chamber toward the switching device and permit a flow traveling in an opposite direction; a control valve capable of adjusting a pressure in the supply passage in accordance with a supplied current; an intake passage that connects the supply passage to the discharge passage; an intake check valve provided midway in the intake passage in order to permit only a flow of fluid traveling from the discharge passage toward the supply passage; and a supply-side check valve provided in the supply passage between the control valve and the pump in order to permit only a flow traveling from the pump side toward the control valve side.

DESCRIPTION OF EMBODIMENTS

Figure 1:
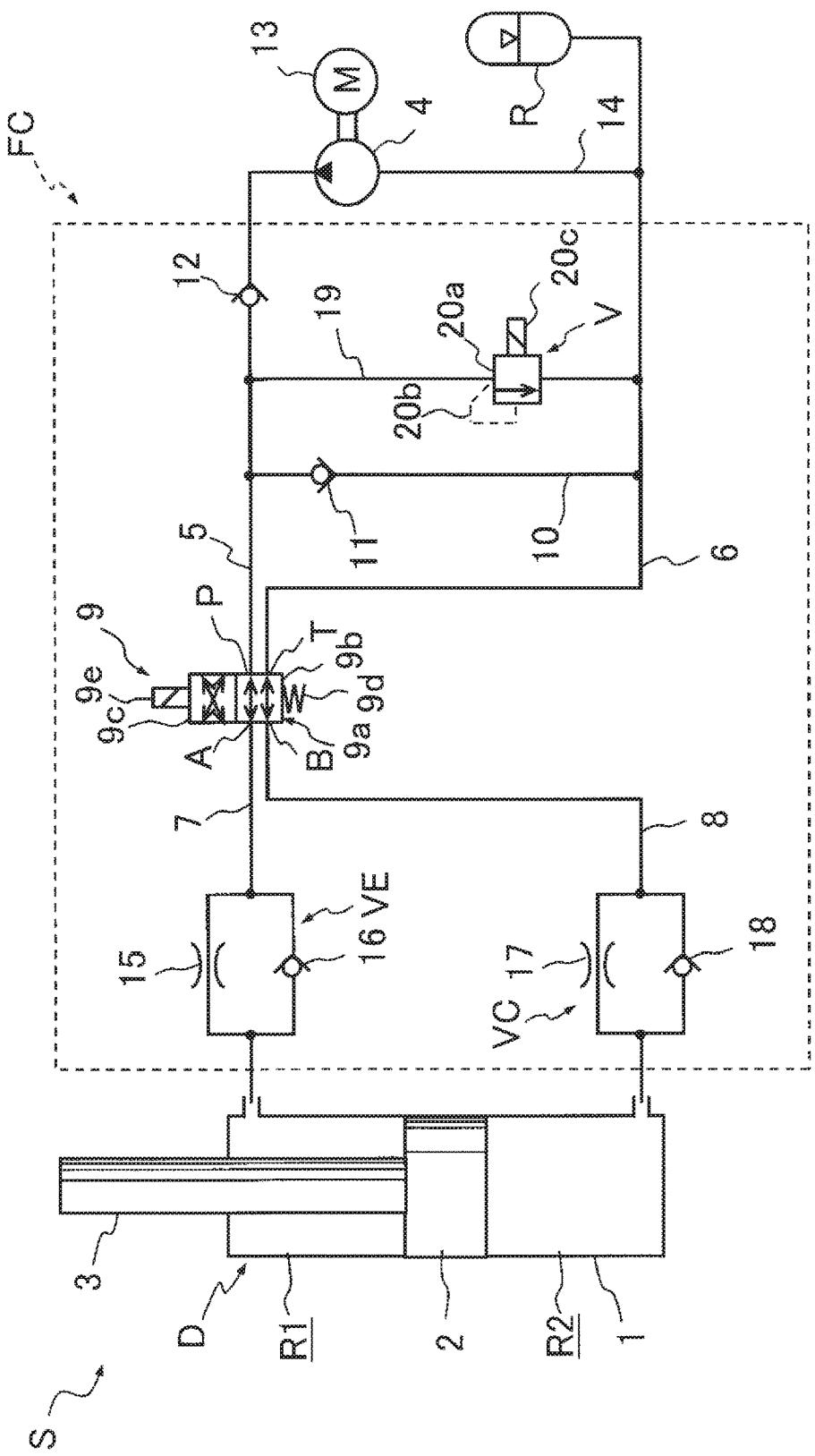
FIG. 1 is a view showing a suspension device according to an embodiment.

An embodiment of the present invention will be described below with reference to the figures. As shown in FIG. 1, a suspension device S according to this embodiment includes a damper D having a cylinder 1 and a piston 2 that is inserted into the cylinder 1 to be free to move and divides the interior of the cylinder 1 into an extension-side chamber R1 and a contraction-side chamber R2, a pump 4, a reservoir R connected to an intake side of the pump 4, and a fluid pressure circuit FC provided between the damper D and the pump 4 and reservoir R.

The fluid pressure circuit FC includes a supply passage 5 connected to a discharge side of the pump 4, a discharge passage 6 connected to the reservoir R, an extension-side passage 7 connected to the extension-side chamber R1, a contraction-side passage 8 connected to the contraction-side chamber R2, a direction switching valve 9 serving as switching device for selectively connecting one of the extension-side passage 7 and the contraction-side passage 8 to the supply passage 5 and connecting the other of the extension-side passage 7 and the contraction-side passage 8 to the discharge passage 6, an extension-side damping element VE provided in the extension-side passage 7 in order to apply resistance to a flow traveling from the extension-side chamber R1 toward the direction switching valve 9 and permit a flow traveling in an opposite direction, a contraction-side damping element VC provided in the contraction-side passage 8 in order to apply resistance to a flow traveling from the contraction-side chamber R2 toward the direction switching valve 9 and permit a flow traveling in an opposite direction, a control valve V capable of adjusting a pressure in the supply passage 5 in accordance with a supplied current, an intake passage 10 that connects the supply passage 5 to the discharge passage 6, an intake check valve 11 provided midway in the intake passage 10 in order to allow a fluid to flow only from the discharge passage 6 toward the supply passage 5, and a supply-side check valve 12 provided in the supply passage 5 between the control valve V and the pump 4 in order to allow only a flow traveling from the pump 4 side toward the control valve V side.

In the suspension device S, the damper D includes a rod 3 that is inserted into the cylinder 1 to be free to move and coupled to the piston 2, and the rod 3 is inserted only into the extension-side chamber R1. The damper D is a so-called single-rod type damper. It should be noted that in FIG. 1, the reservoir R is provided independently of the damper D, but instead, although not shown in detail in the figures, an outer tube may be disposed around the damper D on an outer peripheral side of the cylinder 1, and the reservoir R may be formed from an annular gap between the cylinder 1 and the outer tube.

Figure 2:
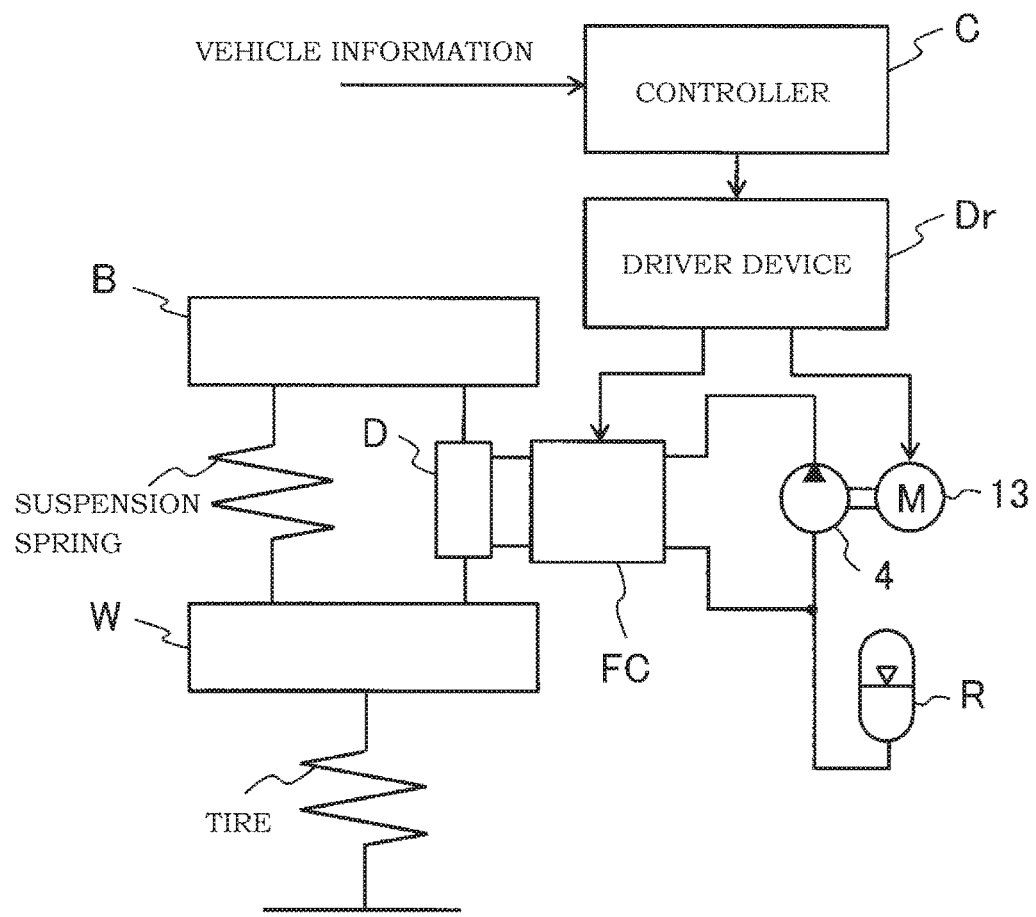
FIG. 2 is a view showing the suspension device according to this embodiment when interposed between a vehicle body and an axle of a vehicle.

When the suspension device S is applied to a vehicle, as shown in FIG. 2, the suspension device S may be interposed between a sprung member B and an unsprung member W of the vehicle by coupling the cylinder 1 to one of the sprung member B and the unsprung member W and coupling the rod 3 to the other of the sprung member B and the unsprung member W.

The extension-side chamber R1 and the contraction-side chamber R2 are filled with a fluid such as working oil, for example, which serves as the fluid, while the reservoir R is filled with the fluid and a gas. A fluid such as water or an aqueous solution, for example, may be used instead of working oil as the fluid charged into the extension-side chamber R1, the contraction-side chamber R2, and the reservoir R. Further, in this embodiment, the chamber that contracts during an extension stroke is set as the extension-side chamber R1, and a chamber that contracts during a contraction stroke is set as the contraction-side chamber R2.

The pump 4 is set as a unidirectional discharge pump that suctions the fluid from intake side and discharges the fluid from the discharge side. The pump 4 is driven by a motor 13. Various types of motors, either DC or AC motors, such as a brushless motor, an induction motor, or a synchronous motor, for example, may be employed as the motor 13.

The intake side of the pump 4 is connected to the reservoir R via a pump passage 14, and the discharge side is connected to the supply passage 5. Hence, the pump 4 is configured to suction the fluid from the reservoir R and discharge the fluid into the supply passage 5 when driven by the motor 13.

The direction switching valve 9 is a solenoid switch valve having four ports and two positions. The direction switching valve 9 includes a valve body 9a having an extension-side supply position 9b and a contraction-side supply position 9c, a spring 9d that biases the valve body 9a, and a solenoid 9e that applies thrust for resisting the spring 9d to the valve body 9a. In the extension-side supply position 9b, communication is established between a port A and a port P and between a port B and a port T, while in the contraction-side supply position 9c, communication is established between the port A and the port T and between the port B and the port P. When power is not supplied to the solenoid 9e such that the direction switching valve 9 is not energized, the valve body 9a is biased by the spring 9d so as to adopt the extension-side supply position 9b, and when power is supplied to the solenoid 9e such that the direction switching valve 9 is energized, the valve body 9a is caused to adopt the contraction-side supply position 9c by thrust from the solenoid 9e.

The port P is connected to the discharge side of the pump 4 via the supply passage 5. The port T is connected to the reservoir R via the discharge passage 6. The port A is connected to the extension-side chamber R1 via the extension-side passage 7, and the port B is connected to the contraction-side chamber R2 via the contraction-side passage 8.

When the direction switching valve 9 adopts the extension-side supply position 9b, the supply passage 5 communicates with the extension-side chamber R1 through the extension-side passage 7, and the discharge passage 6 communicates with the contraction-side chamber R2 through the contraction-side passage 8. When the pump 4 is driven in this condition, the fluid discharged from the pump 4 is supplied to the extension-side chamber R1, and fluid is discharged from the contraction-side chamber R2 into the reservoir R. As a result, the damper D can contract. When the direction switching valve 9 adopts the contraction-side supply position 9c, on the other hand, the supply passage 5 communicates with the contraction-side chamber R2 through the contraction-side passage 8, and the discharge passage 6 communicates with the extension-side chamber R1 through the extension-side passage 7. When the pump 4 is driven in this condition, the fluid discharged from the pump 4 is supplied to the contraction-side chamber R2, and fluid is discharged from the extension-side chamber R1 into the reservoir R. As a result, the damper D can extend.

As described above, the extension-side damping element VE is provided midway in the extension-side passage 7 in order to apply resistance to a flow traveling from the extension-side chamber R1 toward the direction switching valve 9, and permit a flow traveling in the opposite direction.

The extension-side damping element VE includes an extension-side damping valve 15 that applies resistance to a flow traveling from the extension-side chamber R1 toward the direction switching valve 9, and an extension-side check valve 16 provided parallel to the extension-side damping valve 15 in order to permit only a flow traveling from the direction switching valve 9 toward the extension-side chamber R1. Hence, the extension-side check valve 16 is maintained in a closed condition in relation to a flow of fluid traveling from the extension-side chamber R1 toward the direction switching valve 9. As a result, the fluid flows toward the direction switching valve 9 side through the extension-side damping valve 15 only. Conversely, the extension-side check valve 16 is open to a flow of fluid traveling from the direction switching valve 9 toward the extension-side chamber R1, and therefore the fluid flows toward the extension-side chamber R1 side through both of the extension-side damping valve 15 and the extension-side check valve 16. The resistance exerted on the flow by the extension-side check valve 16 is smaller than that of the extension-side damping valve 15, and therefore the fluid flows towards the extension-side chamber R1 side preferentially through the extension-side check valve 16. The extension-side damping valve 15 may be a throttle valve that permits a bidirectional flow, or a damping valve such as a leaf valve or a poppet valve that permits only a flow traveling from the extension-side chamber R1 toward the direction switching valve 9.

As described above, the contraction-side damping element VC is provided midway in the contraction-side passage 8 in order to apply resistance to a flow traveling from the contraction-side chamber R2 toward the direction switching valve 9, and permit a flow traveling in the opposite direction.

The contraction-side damping element VC includes a contraction-side damping valve 17 that applies resistance to a flow traveling from the contraction-side chamber R2 toward the direction switching valve 9, and a contraction-side check valve 18 provided parallel to the contraction-side damping valve 17 in order to permit only a flow traveling from the direction switching valve 9 toward the contraction-side chamber R2. Hence, the contraction-side check valve 18 is maintained in a closed condition in relation to a flow of fluid traveling from the contraction-side chamber R2 toward the direction switching valve 9. As a result, the fluid flows toward the direction switching valve 9 side through the contraction-side damping valve 17 only. Conversely, the contraction-side check valve 18 is open to a flow of fluid traveling from the direction switching valve 9 toward the contraction-side chamber R2, and therefore the fluid flows toward the contraction-side chamber R2 side through both the contraction-side damping valve 17 and the contraction-side check valve 18. The resistance exerted on the flow by the contraction-side check valve 18 is smaller than that of the contraction-side damping valve 17, and therefore the fluid flows towards the contraction-side chamber R2 side preferentially through the contraction-side check valve 18. The contraction-side damping valve 17 may be a throttle valve that permits a bidirectional flow, or a damping valve such as a leaf valve or a poppet valve that permits only a flow traveling from the contraction-side chamber R2 toward the direction switching valve 9.

The control valve V is provided in the fluid pressure circuit FC to control the pressure in the supply passage 5, into which the fluid is discharged from the pump 4. More specifically, the control valve V is provided midway in a control passage 19 that connects the supply passage 5 to the discharge passage 6. The pressure in the supply passage 5 at an upstream side of the control valve V is controlled by adjusting a valve opening pressure of the control valve V.

In this embodiment, the control valve V is a solenoid pressure control valve. The control valve V includes a valve body 20a provided midway in the control passage 19, a pilot passage 20b that exerts the pressure at the upstream side, that is the supply passage 5 side, on the valve body 20a as a pilot pressure in a valve opening direction of the valve body 20a, and a solenoid 20c that applies thrust to the valve body 20a. The solenoid 20c is constituted by a spring and a coil, not shown in the figures. The spring of the solenoid 20c biases the valve body 20a in the valve opening direction at all times, and the coil of the solenoid 20c, when energized, generates thrust for resisting the spring biasing the valve body 20a. Hence, by adjusting an amount by which the coil of the solenoid 20c is energized, the valve opening pressure of the control valve V can be increased or reduced. As a result, the control valve V can control the pressure in the supply passage 5 to the valve opening pressure of the control valve V. It should be noted that although the control valve V is configured to adjust the pressure in the supply passage 5 in accordance with the supplied current, the specific configuration of the control valve V described above is merely an example, and the present invention is not limited thereto.

The control valve V is configured to be capable of obtaining a valve opening pressure that is commensurate with an amount of current supplied to the solenoid 20c. More specifically, the valve opening pressure increases steadily as the amount of current supplied to the solenoid 20c increases, and when no current is supplied, the valve opening pressure falls to a minimum. Further, a characteristic of the control valve V is that in a practical use region of the suspension device S, pressure override, in which pressure loss increases in proportion to the flow, does not occur. It should be noted that the practical use region is a normal displacement speed region of the damper D (a displacement speed region of the damper D when the vehicle travels along a typical conceivable road) in a case where the damper D is used while interposed between a vehicle body B and vehicle wheels W of a vehicle, as shown in FIG. 2. In this embodiment, the practical use region is a region in which the damper D extends and contracts within a range of 1 m per second. Furthermore, the characteristic of the control valve V whereby pressure override, in which the pressure loss increases in proportion to the flow, does not occur in the practical use region means that when the damper D extends and contracts within the practical use region (when an extension/contraction speed of the damper D is within a range of 1 m per second), substantially no pressure override occurs in the control valve V within the range of a flow that can pass through the control valve V. In other words, a characteristic of the control valve V is that when the damper D extends and contracts within the practical use region, the effects of pressure override can be ignored. Moreover, in this embodiment, the valve opening pressure of the control valve V when the control valve V is not energized is set to be very small so that when the control valve V is not energized, substantially no resistance is applied to the flow of fluid passing through the control valve V.

Further, the intake passage 10 that connects the supply passage 5 to the discharge passage 6 is provided parallel to the control passage 19. The intake check valve 11 is provided midway in the intake passage 10 in order to allow the fluid to flow only from the discharge passage 6 toward the supply passage 5, and therefore the intake passage 10 is set as a one-way passage that allows the fluid to flow only from the discharge passage 6 toward the supply passage 5.

The supply-side check valve 12 is provided in the supply passage 5 between the control valve V and the pump 4. More specifically, the supply-side check valve 12 is provided in the supply passage 5 on the pump 4 side of a connection point between the control passage 19 and the intake passage

10. The supply-side check valve 12 permits only a flow traveling from the pump 4 side toward the control valve V side, and prohibits a flow traveling in an opposite direction. Therefore, even when a pressure on the direction switching valve 9 side is higher than a discharge pressure of the pump 4, the supply-side check valve 12 remains closed, thereby preventing the fluid from flowing back to the pump 4 side.

An operation of the suspension device S having the above configuration will now be described. First, a normal operation in which the motor 13, the pump 4, the direction switching valve 9, and the control valve V can all be operated normally will be described.

Specifically, by operating the direction switching valve 9, the fluid discharged by the pump 4 that is driven by the motor 13 is supplied to one of the extension-side chamber R1 and the contraction-side chamber R2, which is connected to the pump 4, and the other is communicated to the reservoir R via the discharge passage 6, and thereby, the damper D can be caused to extend and contract actively, with the result that the damper D functions as an actuator. When thrust is generated by the damper D in an extension direction of the damper D, the direction switching valve 9 adopts the contraction-side supply position 9c such that the contraction-side chamber R2 is connected to the supply passage 5 and the extension-side chamber R1 is connected to the reservoir R. Conversely, when thrust is generated by the damper D in a contraction direction of the damper D, the direction switching valve 9 adopts the extension-side supply position 9b such that the extension-side chamber R1 is connected to the supply passage 5 and the contraction-side chamber R2 is connected to the reservoir R. At this time, the magnitude of the thrust generated in the extension direction or the contraction direction of the damper D can be controlled by adjusting the pressure in the supply passage 5 using the control valve V.

As shown in FIG. 2, for example, a controller C that determines current amounts to be supplied to the control valve V and the motors 13 for driving the pump 4 and selects either the extension-side supply position 9b or the contraction-side supply position 9c of the direction switching valve 9, and a driver device Dr that supplies currents to the control valve V, the direction switching valve 9, and the motor 13 in accordance with the current amounts determined by the controller C upon reception of a command from the controller C are only required to be provided to ensure that the suspension device S generates a target thrust to be applied to the damper D during thrust control. The controller C determines the target thrust to be generated by the damper D in accordance with an appropriate control law for suppressing vehicle vibration on the basis of information from which a vibration condition of the vehicle can be ascertained, for example vehicle information such as vertical direction accelerations and speeds of the sprung member B and the unsprung member W and the extension/contraction speed and an extension/contraction acceleration of the damper D, this information being required by the control law. The driver device Dr includes, for example, a drive circuit for implementing PWM driving on the solenoid 20c of the control valve V and the solenoid 9e of the direction switching valve 9, and a drive circuit for implementing PWM driving on the motor 13. Upon reception of the command from the controller C, the driver device Dr supplies currents to the solenoid 20c, the solenoid 9e, and the motor 13 in accordance with the current amounts determined by the controller C. It should be noted that the respective drive circuits of the driver device Dr may be drive circuits other than drive circuits that perform PWM driving. Further, when the target thrust to be generated by the damper D is to be generated in the extension direction of the damper D, the controller C selects the contraction-side supply position 9c for the direction switching valve 9, and when the target thrust to be generated by the damper D is to be generated in the contraction direction of the damper D, the controller C selects the extension-side supply position 9b for the direction switching valve 9. To switch the direction switching valve 9 to the position selected in the manner described above, the driver device Dr either supplies a current or stops supplying a current to the solenoid 9e. More specifically, in this embodiment, when the damper D is caused to perform a contraction operation, the direction switching valve 9 may be de-energized by halting the current supply to the solenoid 9e. In so doing, the direction switching valve 9 adopts the extension-side supply position 9b, and as a result, fluid is supplied to the extension-side chamber R1 and fluid is discharged from the contraction-side chamber R2 into the reservoir R. Conversely, when the damper D is caused to perform an extension operation, a current may be supplied to the solenoid 9e of the direction switching valve 9. In so doing, the direction switching valve 9 adopts the contraction-side supply position 9c, and as a result, fluid is supplied to the contraction-side chamber R2 and fluid is discharged from the extension-side chamber R1 into the reservoir R. As regards the control law used to control the thrust of the suspension device S, a control law suitable for use in a vehicle, for example a control law such as skyhook control that exhibits a superior effect in terms of suppressing vehicle vibration, is preferably selected for use. Further, in this case, the controller C and the driver device Dr are described as separate components, but the suspension device S may be controlled by a single control device having the functions of the controller C and the driver device Dr. Furthermore, the information input into the controller C may be any information that is appropriate for the control law employed by the controller C, and although not shown in the figures, information detected by various sensors or the like may be input into the controller C as this information.

An operation for causing the damper D to extend and contract actively was described above, but during vehicle travel, the damper D extends and contracts in response to disturbances caused by irregularities on the road surface. Operations performed when the damper D extends and contracts in response to disturbances will be described below.

First, operations performed in a condition where the pump 4 is driven so as to discharge the fluid to the supply passage 5 will be described. When the damper D extends and contracts in response to a disturbance in this condition, four cases, namely two cases corresponding to the direction in which the damper D generates thrust and two cases corresponding to the extension/contraction direction of the damper D, may be envisaged.

First, a case in which the damper D performs an extension operation in response to an external force while the suspension device S generates thrust for pushing the piston 2 down will be described. Since the thrust is generated by the damper D in a direction for pushing the piston 2 down, fluid must be supplied to the extension-side chamber R1. Accordingly, the direction switching valve 9 is switched so as to adopt the extension-side supply position 9b, whereby the extension-side chamber R1 is connected to the supply passage 5 and the contraction-side chamber R2 is connected to the reservoir R through the discharge passage 6.

When the damper D performs an extension operation in response to an external force, the extension-side chamber R1 decreases in volume, and therefore an amount of fluid corresponding to the decrease is discharged from the extension-side chamber R1 through the extension-side damping valve 15, whereupon this fluid flows through the supply passage 5 so as to pass through the control valve V, and then flows into the reservoir R. It should be noted that since the supply-side check valve 12 is provided, the fluid does not flow back to the pump 4 side even when the pressure in the supply passage 5 increases dynamically above the discharge pressure of the pump 4. Meanwhile, the contraction-side chamber R2 increases in volume, and therefore an amount of fluid corresponding to the volume increase is supplied to the contraction-side chamber R2 from the reservoir R through the discharge passage 6.

The pressure in the supply passage 5 is controlled by the control valve V to the valve opening pressure of the control valve V, and therefore the pressure in the extension-side chamber R1 increases above the pressure in the supply passage 5 by an amount corresponding to pressure loss that occurs when the fluid discharged from the extension-side chamber R1 passes through the extension-side damping valve 15. In this case, therefore, the pressure in the extension-side chamber R1 increases above the pressure in the reservoir R by a pressure obtained by superimposing the pressure loss caused by the extension-side damping valve 15 on the valve opening pressure of the control valve V. At this time, taking a surface area by which the piston 2 faces the extension-side chamber R1 (a surface area obtained by subtracting a sectional area of the rod 3 from the surface area of the piston 2) as a pressure receiving surface area, the thrust of the damper D corresponds to a product of the pressure receiving surface area of the piston 2 and the pressure in the extension-side chamber R1. Hence, on a graph shown in FIG. 3, on which the direction of the thrust of the damper D is set as the ordinate and the expansion/contraction speed of the damper D is set as the abscissa, the thrust of the damper D when the valve opening pressure of the control valve V is at a maximum has a characteristic indicated by a line (1) in FIG. 3. It should be noted that in this case, a force constituted by a product of the pressure in the contraction-side chamber R2 and a pressure receiving surface area of the piston 2 on the side thereof that faces the contraction-side chamber R2 is generated as thrust for pushing the piston 2 up, but since the pressure in the contraction-side chamber R2 and the pressure in the reservoir R are equal and the pressure in the extension-side chamber R1 is taken as a differential pressure between the pressure in the extension-side chamber R1 and the pressure in the reservoir R, the thrust for pushing the piston 2 up may be considered to be zero.

Next, a case in which the damper D performs a contraction operation in response to an external force while the suspension device S generates thrust for pushing the piston 2 down will be described. Since the thrust generated by the damper D is generated in the direction for pushing the piston 2 down, fluid must be supplied to the extension-side chamber R1. Likewise in this case, therefore, the direction switching valve 9 is switched so as to adopt the extension-side supply position 9b, whereby the extension-side chamber R1 is connected to the supply passage 5 and the contraction-side chamber R2 is connected to the reservoir R through the discharge passage 6.

When the damper D performs a contraction operation in response to an external force, the extension-side chamber R1 increases in volume. However, when a discharge flow of the pump 4 equals or exceeds an amount by which the volume of the extension-side chamber R1 increases per unit time, the discharge flow of the pump 4 exceeds a flow required by the extension-side chamber R1, and as a result, the fluid discharged from the pump 4 flows into the extension-side chamber R1 through the extension-side check valve 16, while excess fluid, i.e. fluid discharged by the pump 4 but not taken in by the extension-side chamber R1, flows into the reservoir R through the control valve V. Accordingly, the pressure in the extension-side chamber R1 becomes equal to the pressure in the supply passage 5, and is thereby controlled to the valve opening pressure of the control valve V. Meanwhile, the contraction-side chamber R2 decreases in volume, and therefore an amount of fluid corresponding to the volume decrease is discharged from the contraction-side chamber R2 into the reservoir R through the contraction-side damping valve 17 and the discharge passage 6. The pressure in the contraction-side chamber R2 increases above the pressure in the reservoir R by an amount corresponding to pressure loss that occurs when the fluid discharged from the contraction-side chamber R2 passes through the contraction-side damping valve 17. In this situation, therefore, the pressure in the extension-side chamber R1 becomes equal to the valve opening pressure of the control valve V, while the pressure in the contraction-side chamber R2 increases above the pressure in the reservoir R by an amount corresponding to the pressure loss caused by the contraction-side damping valve 17. Moreover, when the amount of fluid discharged from the contraction-side chamber R2 increases, the pressure loss increases correspondingly. Accordingly, the thrust of the damper D corresponds to a force obtained by subtracting a product of the pressure in the contraction-side chamber R2 and the contraction-side chamber R2 side pressure receiving surface area of the piston 2 from a product of the pressure in the extension-side chamber R1 and the extension-side chamber R1 side pressure receiving surface area of the piston 2. Here, when the amount of fluid discharged from the contraction-side chamber R2 increases, the pressure loss increases correspondingly, leading to a corresponding reduction in the thrust of the damper D. Hence, when the damper D performs a contraction operation in response to an external force and the discharge flow of the pump 4 equals or exceeds the volume increase per unit time of the extension-side chamber R1 in a case where the suspension device S generates thrust for pushing the piston 2 down, the thrust of the damper D when the valve opening pressure of the control valve V is at the maximum has a characteristic indicated by a line (2) in FIG. 3.

However, when the contraction speed of the damper D is high such that the discharge flow of the pump 4 falls below the volume increase per unit time of the extension-side chamber R1, the fluid supply from the pump 4 cannot keep up with the volume increase per unit time of the extension-side chamber R1. Therefore, all of the fluid discharged from the pump 4 is taken in by the extension-side chamber R1, and as a result, no fluid flows to the control valve V. By opening the intake check valve 11 at this time, the fluid deficiency in the extension-side chamber R1 is supplied thereto from the reservoir R through the discharge passage 6 and the intake passage 10. In this situation, the pressure in the extension-side chamber R1 substantially equals the pressure in the reservoir R, while the pressure in the contraction-side chamber R2 increases above the pressure in the reservoir R by an amount corresponding to the pressure loss caused by the contraction-side damping valve 17. As a result, the damper D can no longer generate thrust in the direction for pushing the piston 2 down, and instead generates thrust in the opposite direction, i.e. the direction for pushing the piston 2 up. Hence, when the damper D performs a contraction operation in response to an external force and the discharge flow of the pump 4 is smaller than the volume increase per unit time of the extension-side chamber R1 in a case where the suspension device S attempts to generate thrust for pushing the piston 2 down, thrust cannot be generated in the direction for pushing the piston 2 down, and as a result, the thrust of the damper D takes a characteristic indicated by a line (3) in FIG. 3 regardless of the valve opening pressure of the control valve V. Thus, in a case where the valve opening pressure of the control valve V is set at the maximum, the thrust of the damper D takes the characteristic indicated by the line (2) in FIG. 3 when the discharge flow of the pump 4 equals or exceeds the volume increase per unit time of the extension-side chamber R1, and shifts to the characteristic indicated by the line (3) in FIG. 3 when the discharge flow of the pump 4 falls below the volume increase per unit time of the extension-side chamber R1.

Next, a case in which the damper D performs a contraction operation in response to an external force while the suspension device S generates thrust for pushing the piston 2 up will be described. Since the thrust generated by the damper D is generated in the direction for pushing the piston 2 up, fluid must be supplied to the contraction-side chamber R2. Accordingly, the direction switching valve 9 is switched so as to adopt the contraction-side supply position 9c, whereby the contraction-side chamber R2 is connected to the supply passage 5 and the extension-side chamber R1 is connected to the reservoir R through the discharge passage 6.

When the damper D performs a contraction operation in response to an external force, the contraction-side chamber R2 decreases in volume, and therefore an amount of fluid corresponding to the decrease is discharged from the contraction-side chamber R2 through the contraction-side damping valve 17, whereupon this fluid flows through the supply passage 5 so as to pass through the control valve V, and then flows into the reservoir R. It should be noted that since the supply-side check valve 12 is provided, the fluid does not flow back to the pump 4 side even when the pressure in the supply passage 5 increases dynamically above the discharge pressure of the pump 4. Meanwhile, the extension-side chamber R1 increases in volume, and therefore an amount of fluid corresponding to the volume increase is supplied thereto from the reservoir R through the discharge passage 6.

The pressure in the supply passage 5 is controlled by the control valve V to the valve opening pressure of the control valve V, and therefore the pressure in the contraction-side chamber R2 increases above the pressure in the supply passage 5 by an amount corresponding to the pressure loss that occurs when the fluid discharged from the contraction-side chamber R2 passes through the contraction-side damping valve 17. In this case, therefore, the pressure in the contraction-side chamber R2 increases above the pressure in the reservoir R by a pressure obtained by superimposing the pressure loss caused by the contraction-side damping valve 17 on the valve opening pressure of the control valve V. At this time, taking the surface area by which the piston 2 faces the contraction-side chamber R2 (the surface area of the piston 2) as the pressure receiving surface area, the thrust of the damper D corresponds to a product of the pressure receiving surface area of the piston 2 and the pressure in the contraction-side chamber R2. Hence, on the graph shown in FIG. 3, the thrust of the damper D when the valve opening pressure of the control valve V is at the maximum has a characteristic indicated by a line (4) in FIG. 3. It should be noted that in this case, a force constituted by a product of the pressure in the extension-side chamber R1 and the extension-side chamber R1 side pressure receiving surface area of the piston 2 is generated as thrust for pushing the piston 2 down, but since the pressure in the extension-side chamber R1 and the pressure in the reservoir R are equal and the pressure in the contraction-side chamber R2 is taken as a differential pressure between the pressure in the contraction-side chamber R2 and the pressure in the reservoir R, the thrust for pushing the piston 2 down may be considered to be zero.

A case in which the damper D performs an extension operation in response to an external force while the suspension device S generates thrust for pushing the piston 2 up will now be described. Since the thrust generated by the damper D is generated in the direction for pushing the piston 2 up, fluid must be supplied to the contraction-side chamber R2. In this case, therefore, the direction switching valve 9 is switched so as to adopt the contraction-side supply position 9c, whereby the contraction-side chamber R2 is connected to the supply passage 5 and the extension-side chamber R1 is connected to the reservoir R through the discharge passage 6.

When the damper D performs an extension operation in response to an external force, the contraction-side chamber R2 increases in volume. However, when the discharge flow of the pump 4 equals or exceeds the volume increase per unit time of the contraction-side chamber R2, the discharge flow of the pump 4 exceeds the flow required by the contraction-side chamber R2, and as a result, the fluid discharged from the pump 4 flows into the contraction-side chamber R2 through the contraction-side check valve 18, while the excess fluid that is discharged by the pump 4 but not taken in by the contraction-side chamber R2 flows into the reservoir R through the control valve V. Accordingly, the pressure in the contraction-side chamber R2 becomes equal to the pressure in the supply passage 5, and is thereby controlled to the valve opening pressure of the control valve V. Meanwhile, the extension-side chamber R1 decreases in volume, and therefore an amount of fluid corresponding to the volume decrease is discharged from the extension-side chamber R1 into the reservoir R through the extension-side damping valve 15 and the discharge passage 6. The pressure in the extension-side chamber R1 increases above the pressure in the reservoir R by an amount corresponding to the pressure loss that occurs when the fluid discharged from the extension-side chamber R1 passes through the extension-side damping valve 15. In this situation, therefore, the pressure in the contraction-side chamber R2 becomes equal to the valve opening pressure of the control valve V, while the pressure in the extension-side chamber R1 increases above the pressure in the reservoir R by an amount corresponding to the pressure loss caused by the extension-side damping valve 15. Moreover, when the amount of fluid discharged from the extension-side chamber R1 increases, the pressure loss increases correspondingly. Accordingly, the thrust of the damper D corresponds to a force obtained by subtracting a product of the pressure in the extension-side chamber R1 and the extension-side chamber R1 side pressure receiving surface area of the piston 2 from a product of the pressure in the contraction-side chamber R2 and the contraction-side chamber R2 side pressure receiving surface area of the piston 2. Here, when the amount of fluid discharged from the extension-side chamber R1 increases, the pressure loss increases correspondingly, leading to a corresponding reduction in the thrust of the damper D. Hence, when the damper D performs an extension operation in response to an external force and the discharge flow of the pump 4 equals or exceeds the volume increase per unit time of the contraction-side chamber R2 in a case where the suspension device S generates thrust for pushing the piston 2 up, the thrust of the damper D when the valve opening pressure of the control valve V is at the maximum has a characteristic indicated by a line (5) in FIG. 3.

However, when the extension speed of the damper D is high such that the discharge flow of the pump 4 falls below the volume increase per unit time of the contraction-side chamber R2, the fluid supply from the pump 4 cannot keep up with the volume increase per unit time of the contraction-side chamber R2. Therefore, all of the fluid discharged from the pump 4 is taken in by the contraction-side chamber R2, and as a result, no fluid flows to the control valve V. By opening the intake check valve 11 at this time, the fluid deficiency in the contraction-side chamber R2 is supplied thereto from the reservoir R through the discharge passage 6 and the intake passage 10. In this situation, the pressure in the contraction-side chamber R2 substantially equals the pressure in the reservoir R, while the pressure in the extension-side chamber R1 increases above the pressure in the reservoir R by an amount corresponding to the pressure loss caused by the extension-side damping valve 15. As a result, the damper D can no longer generate thrust in the direction for pushing the piston 2 up, and instead generates thrust in the opposite direction, i.e. the direction for pushing the piston 2 down. Hence, when the damper D performs an extension operation in response to an external force and the discharge flow of the pump 4 is smaller than the volume increase per unit time of the contraction-side chamber R2 in a case where the suspension device S attempts to generate thrust for pushing the piston 2 up, thrust cannot be generated in the direction for pushing the piston 2 up, and as a result, the thrust of the damper D takes a characteristic indicated by a line (6) in FIG. 3 regardless of the valve opening pressure of the control valve V. Thus, in a case where the valve opening pressure of the control valve V is set at the maximum, the thrust of the damper D takes the characteristic indicated by the line (5) in FIG. 3 when the discharge flow of the pump 4 equals or exceeds the volume increase per unit time of the contraction-side chamber R2, and shifts to the characteristic indicated by the line (6) in FIG. 3 when the discharge flow of the pump 4 falls below the volume increase per unit time of the contraction-side chamber R2. It should be noted that on the contraction side, the thrust of the damper D shifts from the line (2) to the line (3) in FIG. 3, while on the extension side, the thrust of the damper D shifts from the line (5) to the line (6) in FIG. 3. However, these characteristic shifts occur instantaneously, and therefore the effect on passenger comfort is negligible.

Figure 3:
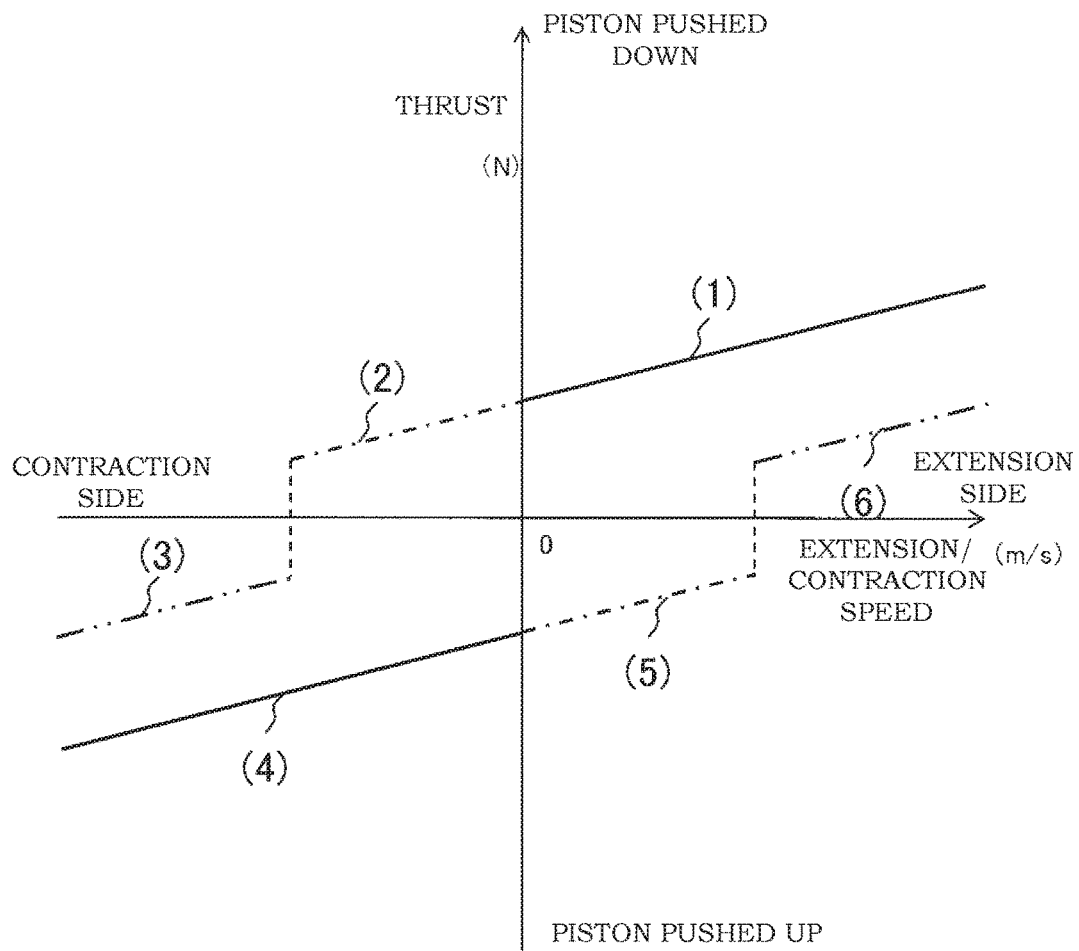
FIG. 3 is a view showing a thrust characteristic of the suspension device according to this embodiment when caused to function as an active suspension.

By adjusting the valve opening pressure of the control valve V in the manner described above, the thrust of the damper D can be varied within a range extending from a line that connects the line (1) to the line (3) to a line that connects the line (4) to the line (6) in FIG. 3. Further, by driving the pump 4, thrust can be generated in the same direction as the extension/contraction direction of the damper D in a case where the discharge flow of the pump 4 is supplied to the chamber on the expanding side, among the extension-side chamber R1 and the contraction-side chamber R2, and the discharge flow of the pump 4 equals or exceeds the volume increase of the expanding chamber.

Next, operations of the suspension device S in a stopped condition where the pump 4 is not driven will be described. Likewise in this condition, four cases, namely two cases corresponding to the direction in which the damper D extends and contracts in response to a disturbance and two cases corresponding to the direction in which the damper D generates thrust, may be envisaged.

First, a case in which the damper D performs an extension operation in response to an external force while the suspension device S generates thrust for pushing the piston 2 down will be described. Since the thrust generated by the damper D is generated in the direction for pushing the piston 2 down, the direction switching valve 9 is switched so as to adopt the extension-side supply position 9b, whereby the extension-side chamber R1 is connected to the supply passage 5 and the contraction-side chamber R2 is connected to the reservoir through the discharge passage 6.

When the damper D performs an extension operation, the extension-side chamber R1 decreases in volume, and therefore an amount of fluid corresponding to the decrease is discharged from the extension-side chamber R1 through the extension-side damping valve 15, whereupon this fluid flows through the supply passage 5 so as to pass through the control valve V, and then flows into the reservoir R. It should be noted that since the supply-side check valve 12 is provided, the fluid does not flow back to the pump 4 side. Meanwhile, the contraction-side chamber R2 increases in volume, and therefore an amount of fluid corresponding to the volume increase is supplied to the contraction-side chamber R2 from the reservoir R through the discharge passage 6.

Figure 4:
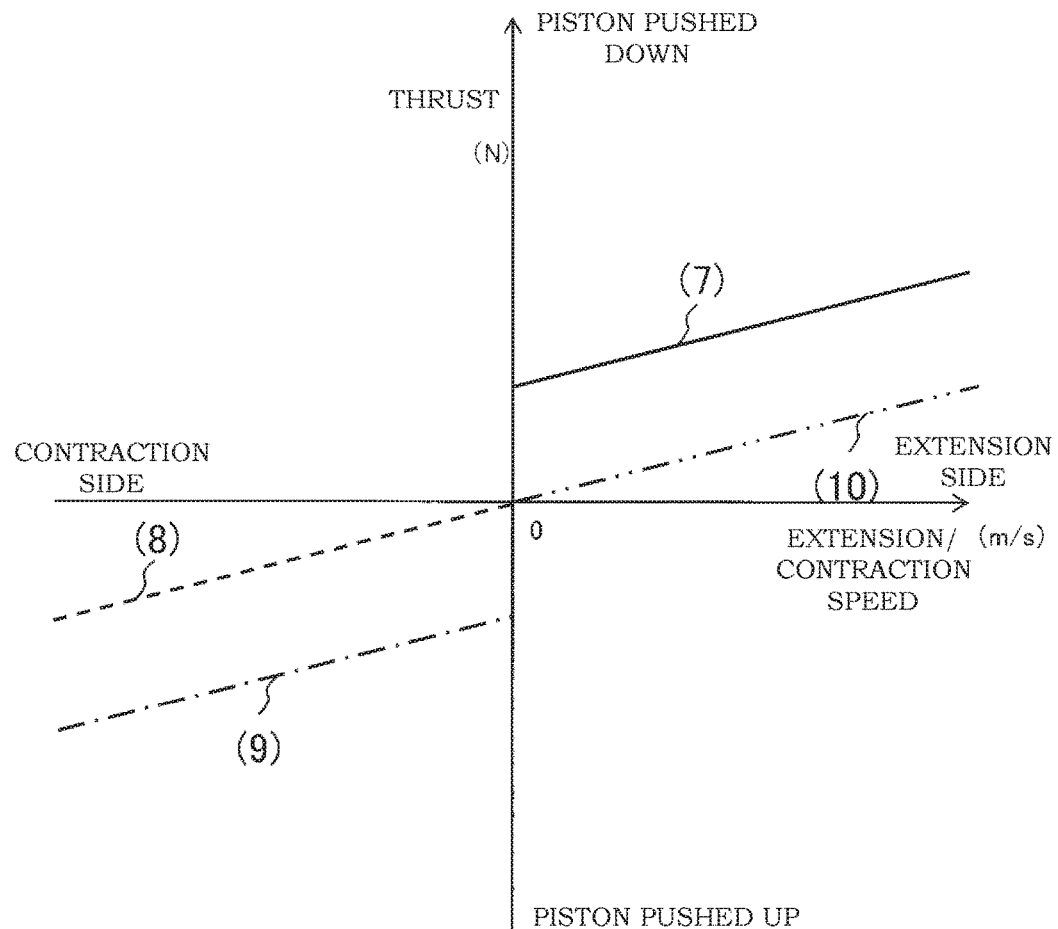
FIG. 4 is a view showing the thrust characteristic of the suspension device according to this embodiment when caused to function as a semi-active suspension.

The pressure in the supply passage 5 is controlled by the control valve V to the valve opening pressure of the control valve V, and therefore the pressure in the extension-side chamber R1 increases above the pressure in the supply passage 5 by an amount corresponding to the pressure loss that occurs when the fluid discharged from the extension-side chamber R1 passes through the extension-side damping valve 15. In this case, therefore, the pressure in the extension-side chamber R1 increases above the pressure in the reservoir R by a pressure obtained by superimposing the pressure loss caused by the extension-side damping valve 15 on the valve opening pressure of the control valve V. At this time, the thrust of the damper D corresponds to a product of the extension-side chamber R1 side pressure receiving surface area of the piston 2 and the pressure in the extension-side chamber R1. Hence, on a graph shown in FIG. 4, on which the direction of the thrust of the damper D is set as the ordinate and the extension/contraction speed of the damper D is set as the abscissa, the thrust of the damper D when the valve opening pressure of the control valve V is at the maximum has a characteristic indicated by a line (7) in FIG. 4. By adjusting the valve opening pressure of the control valve V, the thrust of the damper D can be varied within a range extending from the abscissa to the line (7) within a first quadrant of FIG. 4. It should be noted that in this case, the force constituted by the product of the pressure in the contraction-side chamber R2 and the contraction-side chamber R2 side pressure receiving surface area of the piston 2 is generated as thrust for pushing the piston 2 up, but since the pressure in the contraction-side chamber R2 and the pressure in the reservoir R are equal and the pressure in the extension-side chamber R1 is taken as the differential pressure between the pressure in the extension-side chamber R1 and the pressure in the reservoir R, the thrust for pushing the piston 2 up may be considered to be zero.

Next, a case in which the damper D performs a contraction operation in response to an external force while the suspension device S generates thrust for pushing the piston 2 down will be described. When the pump 4 is stopped, no fluid is supplied by the pump 4, but since the thrust generated by the damper D is generated in the direction for pushing the piston 2 down, the direction switching valve 9 is switched so as to adopt the extension-side supply position 9b, whereby the extension-side chamber R1 is connected to the supply passage 5 and the contraction-side chamber R2 is connected to the reservoir R through the discharge passage 6.

When the damper D performs a contraction operation, the extension-side chamber R1 increases in volume, but since no fluid is discharged by the pump 4, no fluid flows to the control valve V, and therefore the fluid deficiency in the extension-side chamber R1 is supplied from the reservoir R through the discharge passage 6 and the intake passage 10 by opening the intake check valve 11. In this situation, the pressure in the extension-side chamber R1 substantially equals the pressure in the reservoir R. Meanwhile, the contraction-side chamber R2 decreases in volume, and therefore an amount of fluid corresponding to the volume decrease is discharged from the contraction-side chamber R2 into the reservoir R through the contraction-side damping valve 17 and the discharge passage 6. The pressure in the contraction-side chamber R2 increases above the pressure in the reservoir R by an amount corresponding to the pressure loss that occurs when the fluid discharged from the contraction-side chamber R2 passes through the contraction-side damping valve 17. As a result, the damper D cannot generate thrust in the direction for pushing the piston 2 down, and instead generates thrust in the opposite direction, i.e. the direction for pushing the piston 2 up. Hence, when the damper D performs a contraction operation in response to an external force and the pump 4 is stopped in a case where the suspension device S attempts to generate thrust for pushing the piston 2 down, thrust cannot be generated in the direction for pushing the piston 2 down, and therefore the thrust of the damper D takes a characteristic indicated by a line (8) in FIG. 4 regardless of the valve opening pressure of the control valve V. As a result, an equivalent effect to that obtained when a variable damping force damper controls a contraction-side damping force to a minimum damping force is obtained.

Next, a case in which the damper D performs a contraction operation in response to an external force while the suspension device S generates thrust for pushing the piston 2 up will be described. The thrust generated by the damper D is generated in the direction for pushing the piston 2 up, and therefore the direction switching valve 9 is switched so as to adopt the contraction-side supply position 9c, whereby the contraction-side chamber R2 is connected to the supply passage 5 and the extension-side chamber R1 is connected to the reservoir R through the discharge passage 6.

When the damper D performs a contraction operation, the contraction-side chamber R2 decreases in volume, and therefore an amount of fluid corresponding to the decrease is discharged from the contraction-side chamber R2 through the contraction-side damping valve 17, whereupon this fluid flows through the supply passage 5 so as to pass through the control valve V, and then flows into the reservoir R. It should be noted that since the supply-side check valve 12 is provided, the fluid does not flow back to the pump 4 side. Meanwhile, the extension-side chamber R1 increases in volume, and therefore an amount of fluid corresponding to the volume increase is supplied thereto from the reservoir R through the discharge passage 6.

The pressure in the supply passage 5 is controlled by the control valve V to the valve opening pressure of the control valve V, and therefore the pressure in the contraction-side chamber R2 increases above the pressure in the supply passage 5 by an amount corresponding to the pressure loss that occurs when the fluid discharged from the contraction-side chamber R2 passes through the contraction-side damping valve 17. In this case, therefore, the pressure in the contraction-side chamber R2 increases above the pressure in the reservoir R by a pressure obtained by superimposing the pressure loss caused by the contraction-side damping valve 17 on the valve opening pressure of the control valve V. At this time, the thrust of the damper D corresponds to the product of the contraction-side chamber R2 side pressure receiving surface area of the piston 2 and the pressure in the contraction-side chamber R2. Hence, on the graph shown in FIG. 4, the thrust of the damper D when the valve opening pressure of the control valve V is at the maximum has a characteristic indicated by a line (9) in FIG. 4. By adjusting the valve opening pressure of the control valve V, the thrust of the damper D can be varied within a range extending from the abscissa to the line (9) within a third quadrant of FIG. 4. It should be noted that in this case, the force constituted by the product of the pressure in the extension-side chamber R1 and the extension-side chamber R1 side pressure receiving surface area of the piston 2 is generated as thrust for pushing the piston 2 down, but since the pressure in the extension-side chamber R1 and the pressure in the reservoir R are equal and the pressure in the contraction-side chamber R2 is taken as the differential pressure between the pressure in the contraction-side chamber R2 and the pressure in the reservoir R, the thrust for pushing the piston 2 down may be considered to be zero.

Next, a case in which the damper D performs an extension operation in response to an external force while the suspension device S generates thrust for pushing the piston 2 up will be described. When the pump 4 is stopped, no fluid is supplied by the pump 4, but since the thrust generated by the damper D is generated in the direction for pushing the piston 2 up, the direction switching valve 9 is switched so as to adopt the contraction-side supply position 9c, whereby the contraction-side chamber R2 is connected to the supply passage 5 and the extension-side chamber R1 is connected to the reservoir R through the discharge passage 6.

When the damper D performs an extension operation, the contraction-side chamber R2 increases in volume, but since no fluid is discharged by the pump 4, no fluid flows to the control valve V, and therefore the fluid deficiency in the contraction-side chamber R2 is supplied thereto from the reservoir R through the discharge passage 6 and the intake passage 10 by opening the intake check valve 11. In this situation, the pressure in the contraction-side chamber R2 substantially equals the pressure in the reservoir R. Meanwhile, the extension-side chamber R1 decreases in volume, and therefore an amount of fluid corresponding to the volume decrease is discharged from the extension-side chamber R1 into the reservoir R through the extension-side damping valve 15 and the discharge passage 6. The pressure in the extension-side chamber R1 increases above the pressure in the reservoir R by an amount corresponding to the pressure loss that occurs when the fluid discharged from the extension-side chamber R1 passes through the extension-side damping valve 15. As a result, the damper D cannot generate thrust in the direction for pushing the piston 2 up, and instead generates thrust in the opposite direction, i.e. the direction for pushing the piston 2 down. Hence, when the damper D performs an extension operation in response to an external force and the pump 4 is stopped in a case where the suspension device S attempts to generate thrust for pushing the piston 2 up, the damper D cannot generate thrust in the direction for pushing the piston 2 up, and therefore the thrust of the damper D takes a characteristic indicated by a line (10) in FIG. 4 regardless of the valve opening pressure of the control valve V. As a result, an equivalent effect to that obtained when a variable damping force damper controls an extension-side damping force to the minimum damping force is obtained.

Normally, when extension-side damping force (force generated in a direction for pushing a piston down) is required by a semi-active suspension in a case where skyhook control is executed in accordance with Karnopp's law using a variable damping force damper, the damping force of the variable damping force damper is controlled to a damping force at which the target thrust is obtained during an extension operation, whereas during a contraction operation, extension-side damping force cannot be obtained, and therefore the damping force is controlled such that the minimum damping force is generated on the contraction side. When contraction-side damping force (force generated in a direction for pushing the piston up) is required, meanwhile, the damping force of the variable damping force damper is controlled to a damping force at which the target thrust is obtained during the contraction operation, whereas during the extension operation, contraction-side damping force cannot be obtained, and therefore the damping force is controlled such that the minimum damping force is generated on the extension side. With the suspension device S according to this embodiment, on the other hand, when the damper D is caused to generate thrust for pushing the piston 2 down while the pump 4 is stopped, the thrust of the damper D is controlled within an outputtable range by adjusting the valve opening pressure of the control valve V during the extension operation, while during the contraction operation, the damper D generates the minimum thrust for pushing the piston 2 up even after an attempt is made to cause the damper D to generate thrust for pushing the piston 2 down. Conversely, when the damper D is caused to generate thrust for pushing the piston 2 up, the thrust of the damper D is controlled within the outputtable range by adjusting the valve opening pressure of the control valve V during the contraction operation, while during the extension operation, the damper D generates the minimum thrust for pushing the piston 2 down even after an attempt is made to cause the damper D to generate thrust for pushing the piston 2 up. Hence, the suspension device S according to this embodiment automatically exhibits identical functions to a semi-active suspension when the pump 4 is stopped. Accordingly, the suspension device S automatically functions as a semi-active suspension in a case where the pump 4 is driven but the discharge flow of the pump 4 falls below the volume increase in the expanding chamber, among the extension-side chamber R1 and the contraction-side chamber R2.

Finally, operations executed by the suspension device S when an energization failure occurs due to an energization abnormality in the motor 13, the direction switching valve 9, and the control valve V of the suspension device S will be described. This type of failure includes not only a case in which the motor 13, the direction switching valve 9, and the control valve V cannot be energized, but also a case in which energization of the motor 13, the direction switching valve 9, and the control valve V is stopped due to an abnormality detected in the controller C or the driver device Dr, for example.

During a failure, energization of the motor 13, the direction switching valve 9, and the control valve V is either stopped or impossible, and therefore the pump 4 stops, the valve opening pressure of the control valve V falls to the minimum, and the direction switching valve 9 is biased by the spring 9*d* so as to adopt the extension-side supply position 9*b*.

When the damper D performs an extension operation in response to an external force in this condition, the extension-side chamber R1 decreases in volume, and therefore an amount of fluid corresponding to the decrease is discharged from the extension-side chamber R1 through the extension-side damping valve 15, whereupon this fluid flows through the supply passage 5 so as to pass through the control valve V, and then flows into the reservoir R. It should be noted that since the supply-side check valve 12 is provided, the fluid does not flow back to the pump 4 side. Meanwhile, the contraction-side chamber R2 increases in volume, and therefore an amount of fluid corresponding to the volume increase is supplied to the contraction-side chamber R2 from the reservoir R through the discharge passage 6.

The fluid discharged from the extension-side chamber R1 passes through the control valve V, but due to the characteristic of the control valve V whereby substantially no resistance is applied to a flow passing through the control valve V when the control valve V is not energized, the pressure in the supply passage 5 become substantially equal to the pressure in the reservoir R. Hence, the pressure in the extension-side chamber R1 increases above the pressure in the supply passage 5 by an amount corresponding to the pressure loss that occurs when the fluid discharged from the extension-side chamber R1 passes through the extension-side damping valve 15, and as a result, the pressure in the extension-side chamber R1 likewise increases above the pressure in the reservoir R by an amount corresponding to this pressure loss.

Figure 5:
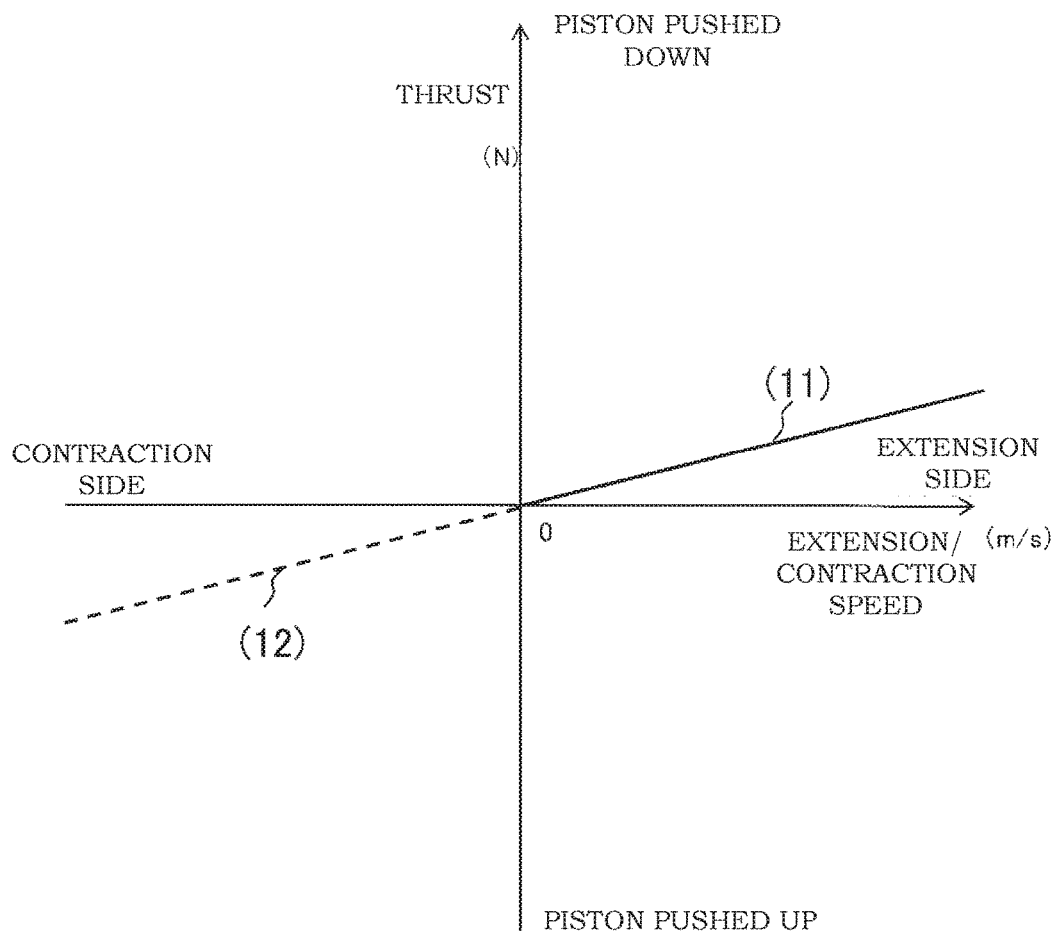
FIG. 5 is a view showing the thrust characteristic of the suspension device according to this embodiment during a failure.

Accordingly, the thrust of the damper D corresponds to a force obtained by multiplying the extension-side chamber R1 side pressure receiving surface area of the piston 2 by a pressure corresponding to the pressure loss caused by the extension-side damping valve 15, and therefore, on the graph shown in FIG. 5, the thrust of the damper D has a characteristic indicated by a line (11) in FIG. 5. It should be noted that in this case, a force constituted by the product of the pressure in the contraction-side chamber R2 and the pressure receiving surface area of the piston 2 on the side thereof that faces the contraction-side chamber R2 is generated as thrust for pushing the piston 2 up, but since the pressure in the contraction-side chamber R2 and the pressure in the reservoir R are equal and the pressure in the extension-side chamber R1 is taken as the differential pressure between the pressure in the extension-side chamber R1 and the pressure in the reservoir R, the thrust for pushing the piston 2 up may be considered to be zero.

Conversely, when the damper D performs a contraction operation in response to an external force, the contraction-side chamber R2 decreases in volume, and therefore an amount of fluid corresponding to the decrease is discharged from the contraction-side chamber R2 through the contraction-side damping valve 17, whereupon this fluid flows into the reservoir R. Meanwhile, the extension-side chamber R1 increases in volume, and therefore an amount of fluid corresponding to the volume increase is discharged from the reservoir R via the discharge passage 6 and supplied to the extension-side chamber R1 through the intake passage 10 and the intake check valve 11. It should be noted that since the supply-side check valve 12 is provided, no fluid flows to the pump 4 side.

Hence, the pressure in the contraction-side chamber R2 increases above the pressure in the reservoir R by an amount corresponding to the pressure loss that occurs when the fluid discharged from the contraction-side chamber R2 passes through the contraction-side damping valve 17.

Accordingly, the thrust of the damper D corresponds to a force obtained by multiplying the contraction-side chamber R2 side pressure receiving surface area of the piston 2 by a pressure corresponding to the pressure loss caused by the contraction-side damping valve 17, and therefore, on the graph shown in FIG. 5, the thrust of the damper D has a characteristic indicated by a line (12) in FIG. 5. It should be noted that in this case, a force constituted by the product of the pressure in the extension-side chamber R1 and the pressure receiving surface area of the piston 2 on the side thereof that faces the extension-side chamber R1 is generated as thrust for pushing the piston 2 down, but since the pressure in the extension-side chamber R1 and the pressure in the reservoir R are equal and the pressure in the contraction-side chamber R2 is taken as the differential pressure between the pressure in the contraction-side chamber R2 and the pressure in the reservoir R, the thrust for pushing the piston 2 down may be considered to be zero.

By having the damper D function as a passive damper in this manner when the suspension device S fails, vibration of the vehicle body B and the vehicle wheels W is suppressed, and as a result, a failsafe operation is performed reliably during a failure.

Hence, with the suspension device S according to this embodiment, the damper D can be caused to extend and contract actively, thereby functioning as an active suspension, and moreover, in a situation where the damper D is expected to generate thrust as a semi-active suspension, the pump 4 does not have to be driven, meaning that the pump 4 only has to be driven when necessary. The suspension device S is therefore capable of functioning as an active suspension while achieving a reduction in energy consumption.

Further, when the control valve V shows a pressure non override property for the flow amount, the pressure acting on the pump 4 decreases, leading to a reduction in the amount of energy consumed by the pump 4, and as a result, energy consumption can be suppressed even more effectively.

Furthermore, the suspension device S is capable of performing a failsafe operation during a failure as well as functioning as an active suspension. The suspension device S includes only two solenoid valves having inbuilt solenoids, namely the direction switching valve 9 and the control valve V, and therefore the number of solenoid valves can be reduced in comparison with a conventional suspension device, enabling a reduction in system costs. Moreover, the driver device Dr for driving the direction switching valve 9 and the control valve V need only be provided with drive circuits for driving the two solenoids 9e, 20c, and therefore the number of drive circuits provided in the driver device Dr can be reduced in comparison with a conventional suspension device that requires three or more solenoid valves. As a result, the cost of the driver device Dr for driving the suspension device S can also be reduced.

Furthermore, in the suspension device S, the extension-side damping element VE includes the extension-side damping valve 15 that applies resistance to a flow traveling from the extension-side chamber R1 toward the direction switching valve 9 serving as the switching device, and the extension-side check valve 16 that is provided parallel to the extension-side damping valve 15 and permits only a flow traveling from the direction switching valve 9 toward the extension-side chamber R1, while the contraction-side damping element VC includes the contraction-side damping valve 17 that applies resistance to a flow traveling from the contraction-side chamber R2 toward the direction switching valve 9, and the contraction-side check valve 18 that is provided parallel to the contraction-side damping valve 17 and permits only a flow traveling from the direction switching valve 9 toward the contraction-side chamber R2. Hence, when fluid is supplied from the pump 4 to the extension-side chamber R1 or the contraction-side chamber R2, the fluid can be supplied to the extension-side chamber R1 or the contraction-side chamber R2 while receiving substantially no resistance from the extension-side check valve 16 or the contraction-side check valve 18, and therefore the load of the pump 4 can be lightened when the extension/contraction direction of the damper D matches the direction of the generated thrust. Further, when the fluid is discharged from the extension-side chamber R1 or the contraction-side chamber R2, resistance is applied to the flow of fluid as the fluid passes through the extension-side damping valve 15 or the contraction-side damping valve 17, and therefore the pressure in the extension-side chamber R1 or the contraction-side chamber R2 can be set at or above the valve opening pressure of the control valve V such that a large amount of thrust can be obtained. Accordingly, a large amount of thrust can be generated by the suspension device S even when the thrust of the solenoid 20c of the control valve V is small. As a result, the control valve V can be reduced in both size and cost. It should be noted that the extension-side damping element VE and the contraction-side damping element VC may be configured to apply resistance to the flow of fluid regardless of the flow direction of the fluid, and when the extension-side damping valve 15 and the contraction-side damping valve 17 are configured to allow bidirectional flows, the extension-side check valve 16 and the contraction-side check valve 18 may be omitted. Likewise in this case, the pump 4 does not have to be driven in a situation where the suspension device S is expected to generate thrust as a semi-active suspension, and therefore a reduction in energy consumption is still obtained.

Figure 6:
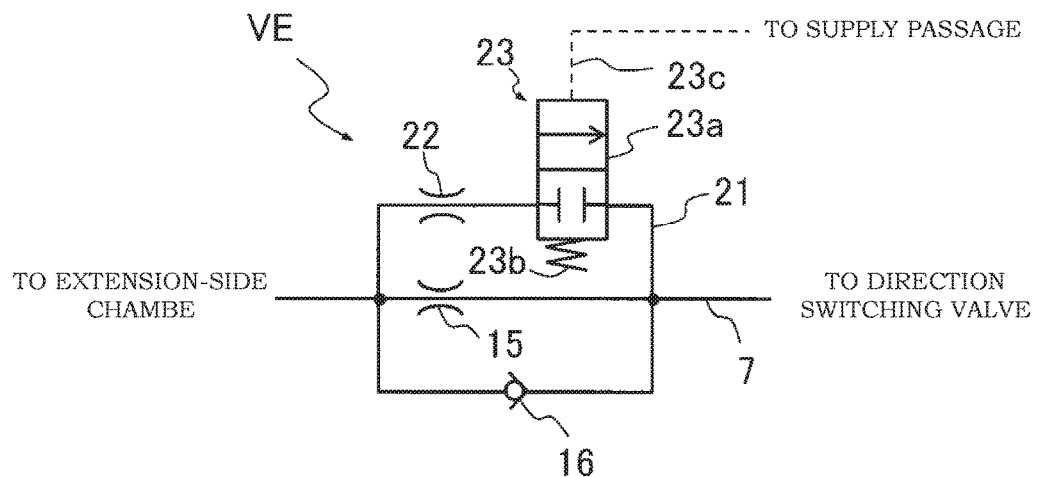
FIG. 6 is a view showing a modified example of an extension-side damping element.

Further, as shown in FIG. 6, the extension-side damping element VE may be configured to include, in addition to the extension-side damping valve 15 and the extension-side check valve 16 of the suspension device S described above, an extension-side bypass passage 21 provided parallel to the extension-side damping valve 15, and a second extension-side damping valve 22 and an extension-side open/close valve 23 provided in the extension-side bypass passage 21. In this case, the extension-side open/close valve 23 is configured to include a valve body 23a that opens and closes the extension-side bypass passage 21, a spring 23b that biases the valve body 23a in a valve closing direction, and a pilot passage 23c into which the pressure in the supply passage 5 is introduced as a pilot pressure in order to bias the valve body 23a in a valve opening direction.

The second extension-side damping valve 22 may be a damping valve that allows the fluid to flow through the extension-side bypass passage 21 in both directions, or a damping valve that allows only the fluid discharged from the extension-side chamber R1 to flow.

When the pressure in the supply passage 5 reaches or exceeds a predetermined value, the valve body 23a of the extension-side open/close valve 23 is biased by the action of the pilot pressure so as to compress the spring 23b, and as a result, the extension-side bypass passage 21 opens. Conversely, when the pressure in the supply passage 5 falls below the predetermined value, the valve body 23a is positioned in a closed condition by the biasing force of the spring 23b, and as a result, the extension-side bypass passage 21 closes.

The predetermined value defining the open and closed positions of the extension-side open/close valve 23 is set either to be equal to the pressure in the reservoir R or at a slightly higher value than the pressure in the reservoir R, for example the minimum valve opening pressure of the control valve V. When a failure occurs in the pump 4, the motor 13 for driving the pump 4, or the like, the pressure in the supply passage 5 becomes substantially equal to the pressure in the reservoir R. In this case, the pilot pressure falls below the predetermined value, and therefore the valve body 23a is biased by the spring 23b so as to close the extension-side bypass passage 21. It should be noted that when fluid is discharged from the extension-side chamber R1 while the pump 4 is driven, the pressure in the supply passage 5 increases above the pressure in the reservoir R, and therefore the extension-side open/close valve 23 is opened so as to open the extension-side bypass passage 21.

Hence, when the extension-side open/close valve 23 is opened during control in which the pump 4 is driven such that fluid is discharged from the extension-side chamber R1, the extension-side damping valve 15 and the second extension-side damping valve 22 both become active. In other words, when control in which the pump 4 is driven is implemented normally on the suspension device S, fluid is discharged from the extension-side chamber R1 more easily during the extension stroke of the damper D. When a failure occurs in the pump 4, the motor 13 for driving the pump 4, or the like, on the other hand, the pressure in the supply passage 5 becomes substantially equal to the pressure in the reservoir R, and therefore the extension-side open/close valve 23 is closed such that only the extension-side damping valve 15 remains active. Hence, with this suspension device S, which includes the extension-side damping element VE having the extension-side bypass passage 21, the second extension-side damping valve 22, and the extension-side open/close valve 23 in addition to the extension-side damping valve 15 and the extension-side check valve 16, the damping force generated during the extension stroke of the damper D can be increased when a failure occurs, thereby ensuring that a damping force deficiency does not occur even during a failure, and as a result, damping can be implemented reliably on the vehicle body B and the vehicle wheels W.

Figure 7:
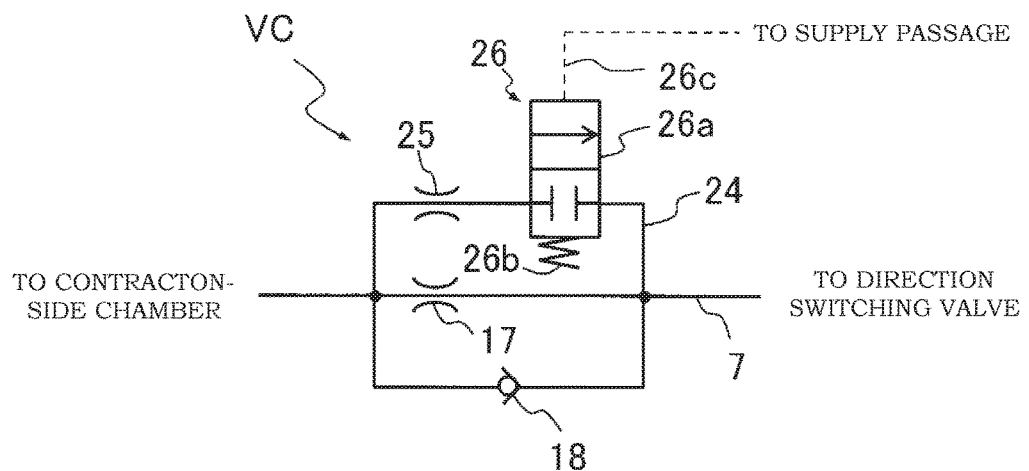
FIG. 7 is a view showing a modified example of a contraction-side damping element.

Likewise on the contraction side, as shown in FIG. 7, the contraction-side damping element VC may be configured to include, in addition to the contraction-side damping valve 17 and the contraction-side check valve 18 of the suspension device S described above, a contraction-side bypass passage 24 provided parallel to the contraction-side damping valve 17, and a second contraction-side damping valve 25 and a contraction-side open/close valve 26 provided in the contraction-side bypass passage 24. In this case, the contraction-side open/close valve 26 is configured to include a valve body 26a that opens and closes the contraction-side bypass passage 24, a spring 26b that biases the valve body 26a in a valve closing direction, and a pilot passage 26c into which the pressure in the supply passage 5 is introduced as a pilot pressure in order to bias the valve body 23a in a valve opening direction.

The second contraction-side damping valve 26 may be a damping valve that allows the fluid to flow through the contraction-side bypass passage 24 in both directions, or a damping valve that allows only the fluid discharged from the contraction-side chamber R2 to flow.

When the pressure in the supply passage 5 reaches or exceeds a predetermined value, the valve body 26a of the contraction-side open/close valve 26 is biased by the action of the pilot pressure so as to compress the spring 26b, and as a result, the contraction-side bypass passage 24 opens. Conversely, when the pressure in the supply passage 5 falls below the predetermined value, the valve body 26a is positioned in a closed condition by the biasing force of the spring 26b, and as a result, the contraction-side bypass passage 24 closes.

The predetermined value defining the open and closed positions of the contraction-side open/close valve 26 is set either to be equal to the pressure in the reservoir R or at a slightly higher value than the pressure in the reservoir R, for example the minimum valve opening pressure of the control valve V. When a failure occurs in the pump 4, the motor 13 for driving the pump 4, or the like, the pressure in the supply passage 5 becomes substantially equal to the pressure in the reservoir R. In this case, the pilot pressure falls below the predetermined value, and therefore the valve body 26a is biased by the spring 26b so as to close the contraction-side bypass passage 24. It should be noted that when fluid is discharged from the contraction-side chamber R2 while the pump 4 is driven, the pressure in the supply passage 5 increases above the pressure in the reservoir R, and therefore the contraction-side open/close valve 26 is opened so as to open the contraction-side bypass passage 24.

Hence, when the contraction-side open/close valve 26 is opened during control in which the pump 4 is driven such that fluid is discharged from the contraction-side chamber R2, the contraction-side damping valve 17 and the second contraction-side damping valve 25 both become active. In other words, when control in which the pump 4 is driven is implemented normally on the suspension device S, fluid is discharged from the contraction-side chamber R2 easily during the contraction stroke of the damper D. When a failure occurs in the pump 4, the motor 13 for driving the pump 4, or the like, on the other hand, the pressure in the supply passage 5 becomes substantially equal to the pressure in the reservoir R, and therefore the contraction-side open/close valve 26 is closed such that only the contraction-side damping valve 17 remains active. Hence, with this suspension device S, which includes the contraction-side damping element VC having the contraction-side bypass passage 24, the second contraction-side damping valve 25, and the contraction-side open/close valve 26 in addition to the contraction-side damping valve 17 and the contraction-side check valve 18, the damping force generated during the contraction stroke of the damper D can be increased when a failure occurs, thereby ensuring that a damping force deficiency does not occur even during a failure, and as a result, damping can be implemented reliably on the vehicle body B and the vehicle wheels W. It should be noted that the contraction-side damping element VC having the contraction-side bypass passage 24, the second contraction-side damping valve 25, and the contraction-side open/close valve 26 in addition to the contraction-side damping valve 17 and the contraction-side check valve 18 may also be applied to the suspension device S that includes the extension-side damping element VE having the extension-side bypass passage 21, the second extension-side damping valve 22, and the extension-side open/close valve 23 in addition to the extension-side damping valve 15 and the extension-side check valve 16.

Figure 8:
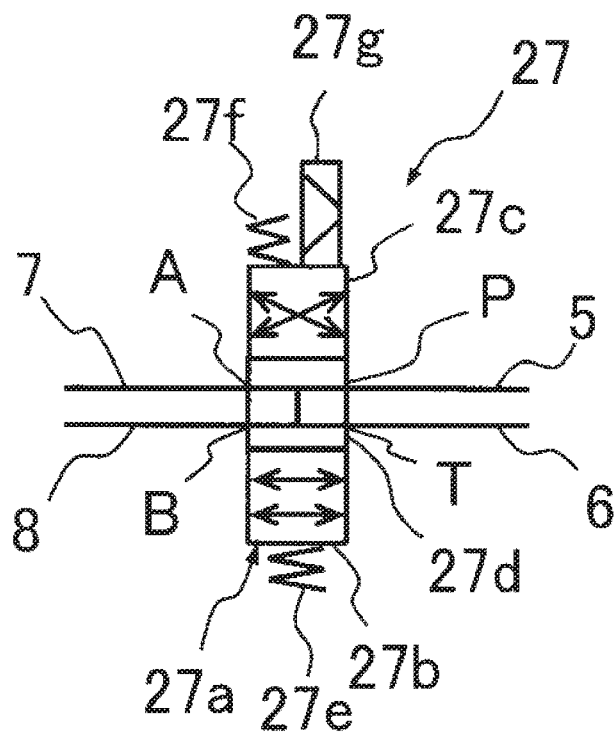
FIG. 8 is a view showing a modified example of switching device.

Furthermore, as shown in FIG. 8, the switching device may be constituted by a direction switching valve 27 having an extension-side supply position 27b in which the supply passage 5 is connected to the extension-side passage 7 and the discharge passage 6 is connected to the contraction-side passage 8, a contraction-side supply position 27c in which the supply passage 5 is connected to the contraction-side passage 8 and the discharge passage 6 is connected to the extension-side passage 7, and a communication position 27*d* in which the supply passage 5, the discharge passage 6, the extension-side passage 7, and the contraction-side passage 8 all communicate with each other instead of the direction switching valve 9 having only two positions, namely the extension-side supply position 9*b* and the contraction-side supply position 9*c*.

The direction switching valve 27 is a solenoid switch valve having four ports and three positions. More specifically, the direction switching valve 27 includes a valve body 27*a* having the extension-side supply position 27*b* in which communication is established between a port A and a port P and between a port B and a port T, the contraction-side supply position 27*c* in which communication is established between the port A and the port T and between the port B and the port P, and the communication position 27*d* in which communication is established between all of the ports A, B, P, and T, springs 27*e*, 27*f* that bias the valve body 27*a* to the communication position 27*d*, and a push-pull solenoid 27*g* that switches the valve body 27*a* selectively to either the extension-side supply position 27*b* or the contraction-side supply position 27*c* against the springs 27*e*, 27*f*. When power is not supplied to the solenoid 27*g* such that the direction switching valve 27 is not energized, the valve body 27*a* is biased by the springs 27*e*, 27*f* so as to adopt the communication position 27*d*, and when power is supplied to the push-pull solenoid 27*g* such that the direction switching valve 27 is energized, the valve body 27*a* is pushed by thrust from the push-pull solenoid 27*g*, whereby the direction switching valve 27 can be switched selectively to either the extension-side supply position 27*b* or the contraction-side supply position 27*c*.

Similarly to the direction switching valve 9 described above, therefore, when the direction switching valve 27 adopts the extension-side supply position 27*b*, the pump 4 communicates with the extension-side chamber R1, whereby the damper D can be caused to contract actively, and when the direction switching valve 27 adopts the contraction-side supply position 27*c*, the pump 4 communicates with the contraction-side chamber R2, whereby the damper D can be caused to extend actively. Moreover, when the direction switching valve 27 adopts the communication position 27*d*, the extension-side chamber R1 and the contraction-side chamber R2 communicate with each other directly through the direction switching valve 27, and therefore, by having the direction switching valve 27 adopt the communication position 27*d* during a failure, damping force can be generated by the extension-side damping element VE and the contraction-side damping element VC during a failure in a similar manner to the suspension device S having the direction switching valve 9, with the result that a failsafe operation can be performed reliably. Furthermore, the push-pull solenoid 27*g* is used as the solenoid, but the push-pull solenoid 27*g* includes two solenoids. Hence, when one of the solenoids is energized, a movable iron core provided in the other solenoid displaces in an axial direction, and therefore, by detecting inductance variation in a coil of the other solenoid or the like, the position of the movable iron core can be ascertained. As a result, it is possible to determine whether or not the direction switching valve 27 is operating normally by detecting the position of the valve body 27*a*, i.e. without providing a sensor for detecting the operation of the valve body 27*a*.

Figure 9:
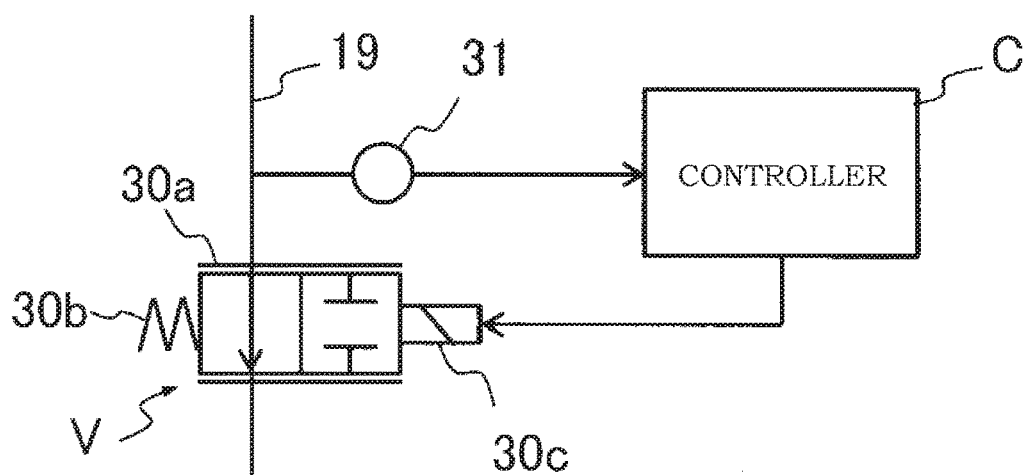
FIG. 9 is a view showing a modified example of a control valve.

The control valve V was described above as a pressure control valve, but as shown in FIG. 9, the control valve V may be a solenoid throttle valve. In this case, the control valve V includes a valve body 30*a* provided midway in the control passage 19, a spring 30*b* that biases the valve body 30*a* in a valve opening direction, and a solenoid 30*c* capable of generating thrust for biasing the valve body 30*a* in a valve closing direction against the spring 30*b*. To control the pressure in the supply passage 5 using the control valve V, a pressure sensor 31 is used to detect the pressure in the supply passage 5. More specifically, for example, the pressure in the supply passage 5 may be detected by the pressure sensor 31, the detected pressure may be fed back, and a target current to be supplied to the solenoid 30*c* may be determined from a deviation between the detected pressure and a target pressure determined by the controller C. It should be noted that the pressure in the supply passage 5 may be determined by the controller C from the target thrust to be generated by the damper D. Then, using the target current determined by the controller C as a command, the driver device Dr supplies a current to the solenoid 30*c* in accordance with the target current, thereby controlling a valve opening of the control valve V such that the pressure in the supply passage 5 is controlled to the target pressure, and as a result, the thrust of the damper D is controlled as desired. When control is implemented by the control valve V in this manner, the pressure in the supply passage 5 is detected by the pressure sensor 31, and therefore an advantage is gained in that it is possible to determine whether or not the fluid pressure circuit FC of the suspension device S is functioning normally. Various valves may be used as the control valve V, as long as the pressure in the supply passage 5 can be adjusted thereby in accordance with the supplied current.

Figure 10:
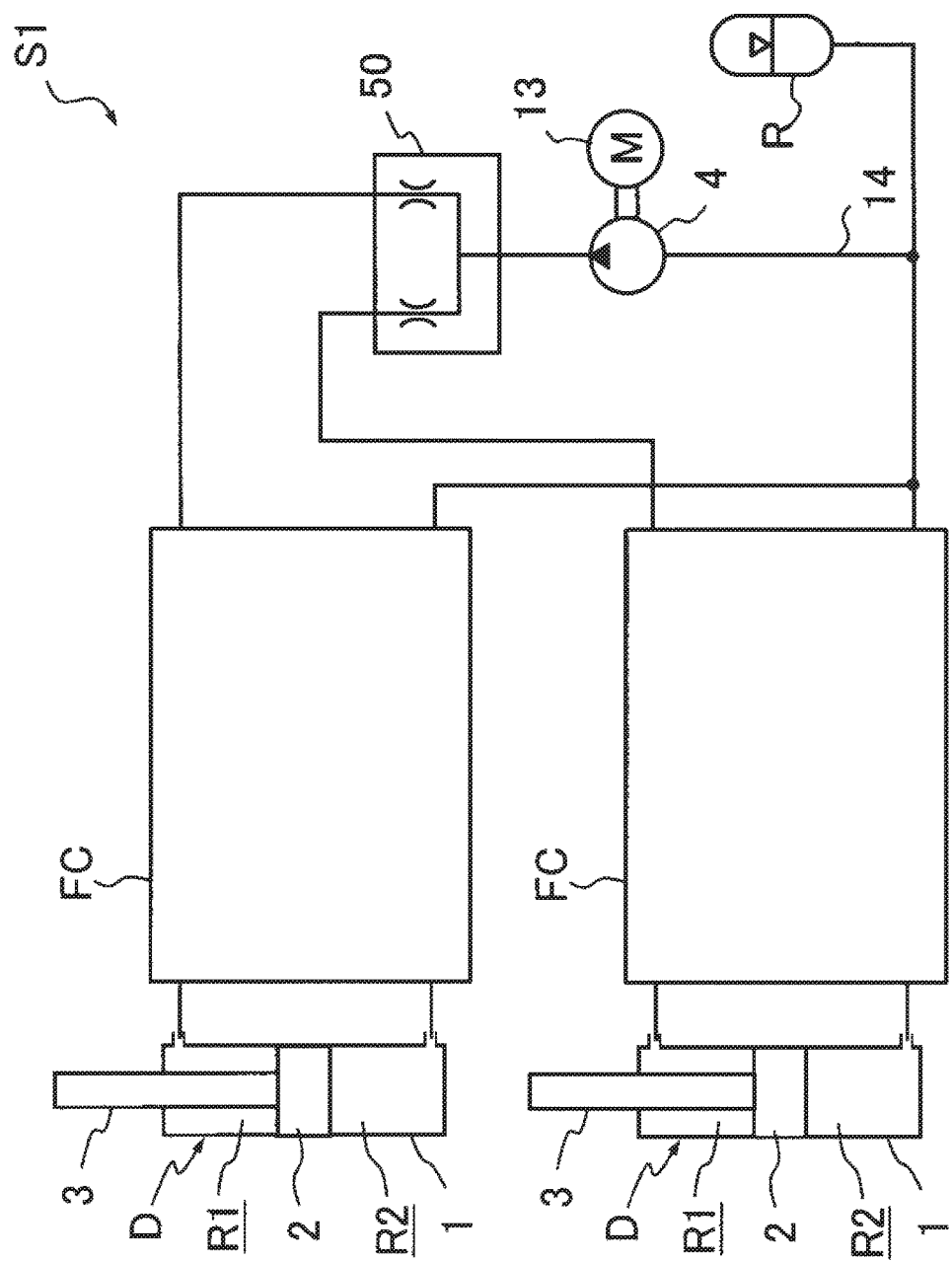
FIG. 10 is a view showing a suspension device according to a modified example of this embodiment.
Figure 11:
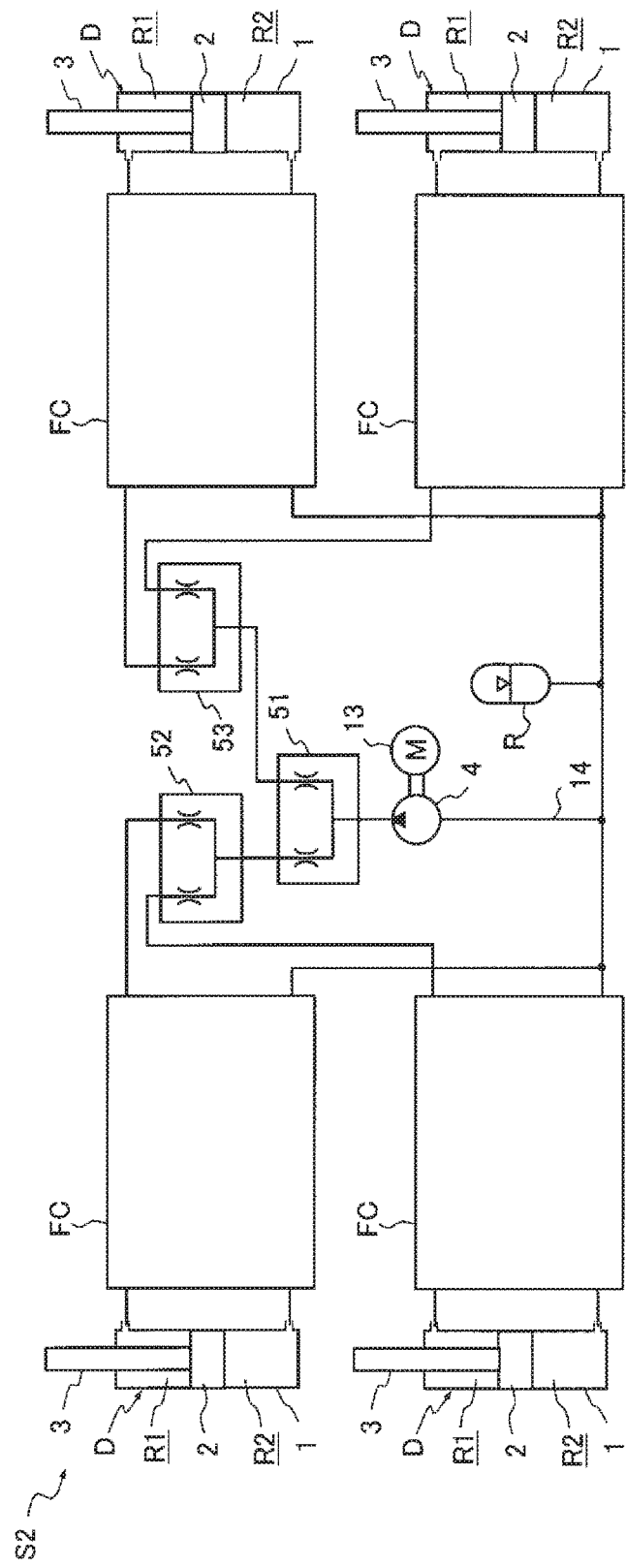
FIG. 11 is a view showing a suspension device according to another modified example of this embodiment.

Finally, in the suspension device S described above, the single damper D is driven using the single pump 4, but by providing the fluid pressure circuit FC between each of a plurality of dampers D and the pump 4 and reservoir R, as shown in FIGS. 10 and 11, the plurality of dampers D can be caused to generate thrust using the single pump 4. More specifically, in a suspension device 51 shown in FIG. 10, two dampers D are driven relative to the single pump 4 by providing a flow dividing valve 50 between the pump 4 and the fluid pressure circuits FC and distributing the fluid discharged from the pump 4 between the respective fluid pressure circuits FC using the flow dividing valve 50. The flow dividing valve 50 distributes the discharge flow from the pump 4 evenly between the two fluid pressure circuits FC, but a distribution ratio may be varied.

In a suspension device S2 shown in FIG. 11, four dampers D are driven relative to the single pump 4 by providing three flow dividing valves 51, 52, 53 between the pump 4 and the four fluid pressure circuits FC and distributing the fluid discharged from the pump 4 between the four fluid pressure circuits FC using the flow dividing valves 51, 52, 53. The flow dividing valves 51, 52, 53 distribute the discharge flow from the pump 4 evenly between the four fluid pressure circuits FC, but the distribution ratio may be varied.

By distributing the discharge flow from the pump 4 between the fluid pressure circuits FC provided for the respective dampers D using the flow dividing valves 50, 51, 52, 53 in this manner, a flow required to generate thrust in each damper D can be supplied by driving the single pump 4. Accordingly, a single motor is sufficient for generating thrust in a plurality of dampers D, and a single drive circuit is sufficient for driving the motor 13 of the driver device Dr. As a result, the overall cost of the system can be reduced even when the number of dampers D is increased.

Embodiments of this invention were described above, but the above embodiments are merely examples of applications of this invention, and the technical scope of this invention is not limited to the specific constitutions of the above embodiments.

This application claims priority based on Japanese Patent Application No. 2014-226734 filed with the Japan Patent Office on Nov. 7, 2014, the entire contents of which are incorporated into this specification.

The invention claimed is:

1. A suspension device comprising:
a damper that has a cylinder and a piston, the piston being inserted into the cylinder to be free to move and defines an extension-side chamber and a contraction-side chamber within the cylinder;
a pump;
a reservoir connected to an intake side of the pump;
a supply passage connected to a discharge side of the pump;
a discharge passage connected to the reservoir;
an extension-side passage connected to the extension-side chamber;
a contraction-side passage connected to the contraction-side chamber;
a switching device that connects one of the extension-side passage and the contraction-side passage to the supply passage and connecting the other of the extension-side passage and the contraction-side passage to the discharge passage selectively;
an extension-side damping element provided in the extension-side passage to apply resistance to a flow traveling from the extension-side chamber toward the switching device and permit a flow traveling in an opposite direction;
a contraction-side damping element provided in the contraction-side passage to apply resistance to a flow traveling from the contraction-side chamber toward the switching device and permit a flow traveling in an opposite direction;
a control valve capable of adjusting a pressure in the supply passage in accordance with a supplied current;
an intake passage that connects the supply passage to the discharge passage;
an intake check valve provided midway in the intake passage in order to permit only a flow of fluid traveling from the discharge passage toward the supply passage; and
a supply-side check valve provided in the supply passage between the control valve and the pump in order to permit only a flow traveling from the pump side toward the control valve side.

2. A suspension device comprising:
a plurality of dampers, each having a cylinder and a piston, the piston being inserted into the cylinder to be free to move and defines an extension-side chamber and a contraction-side chamber within the cylinder;
a pump;
a reservoir connected to an intake side of the pump;
a plurality of fluid pressure circuits provided respectively for the dampers; and
a flow dividing valve that distributes fluid discharged from the pump to the respective fluid pressure circuits, each fluid pressure circuit comprising:
a supply passage connected to a discharge side of the pump via the flow dividing valve;
a discharge passage connected to the reservoir;
an extension-side passage connected to the extension-side chamber;
a contraction-side passage connected to the contraction-side chamber;
a switching device that connects one of the extension-side passage and the contraction-side passage to the supply passage and connecting the other of the extension-side passage and the contraction-side passage to the discharge passage selectively;
an extension-side damping element provided in the extension-side passage to apply resistance to a flow traveling from the extension-side chamber toward the switching device and permit a flow traveling in an opposite direction;
a contraction-side damping element provided in the contraction-side passage to apply resistance to a flow traveling from the contraction-side chamber toward the switching device and permit a flow traveling in an opposite direction;
a control valve capable of adjusting a pressure in the supply passage in accordance with a supplied current;
an intake passage that connects the supply passage to the discharge passage;
an intake check valve provided midway in the intake passage in order to permit only a flow of fluid traveling from the discharge passage toward the supply passage; and
a supply-side check valve provided in the supply passage between the control valve and the pump in order to permit only a flow traveling from the pump side toward the control valve side.

3. The suspension device as defined in claim 1, wherein the control valve has a pressure non override property for a flow amount.

4. The suspension device as defined in claim 1, wherein the extension-side damping element comprises:
an extension-side damping valve that applies resistance to a flow traveling from the extension-side chamber toward the switching device; and
an extension-side check valve provided parallel to the extension-side damping valve in order to permit only a flow traveling from the switching device toward the extension-side chamber, and
the contraction-side damping element comprises:
a contraction-side damping valve that applies resistance to a flow traveling from the contraction-side chamber toward the switching device; and
a contraction-side check valve provided parallel to the contraction-side damping valve in order to permit only a flow traveling from the switching device toward the contraction-side chamber.

5. The suspension device as defined in claim 4, wherein the extension-side damping element comprises:
an extension-side bypass passage provided parallel to the extension-side damping valve; and
a second extension-side damping valve and an extension-side open/close valve provided in the extension-side bypass passage, and
the extension-side open/close valve closes the extension-side bypass passage when a pressure in the supply passage is lower than a predetermined value, and opens the extension-side bypass passage when the pressure in the supply passage equals or exceeds the predetermined value.

6. The suspension device as defined in claim 4, wherein the contraction-side damping element comprises:

a contraction-side bypass passage provided parallel to the contraction-side damping valve; and a second contraction-side damping valve and a contraction-side open/close valve provided in the contraction-side bypass passage, and the contraction-side open/close valve closes the contraction-side bypass passage when a pressure in the supply passage is lower than a predetermined value, and opens the contraction-side bypass passage when the pressure in the supply passage equals or exceeds the predetermined value.

7. The suspension device defined in claim 1, wherein the switching device is a direction switching valve, the direction switching valve includes:

an extension-side supply position in which the supply passage is connected to the extension-side passage and the discharge passage is connected to the contraction-side passage;

a contraction-side supply position in which the supply passage is connected to the contraction-side passage and the discharge passage is connected to the extension-side passage; and a communication position in which the supply passage, the discharge passage, the extension-side passage, and the contraction-side passage all communicate with each other.

8. The suspension device defined in claim 1, wherein the control valve is a solenoid throttle valve controlled on the basis of a pressure in the supply passage, which is detected by a pressure sensor.

9. The suspension device defined in claim 1, wherein the damper includes a rod that is inserted into the cylinder to be free to move and coupled to the piston.

10. The suspension device as defined in claim 2, wherein the control valve has a pressure non override property for a flow amount.

11. The suspension device as defined in claim 2, wherein the extension-side damping element comprises:

an extension-side damping valve that applies resistance to a flow traveling from the extension-side chamber toward the switching device; and an extension-side check valve provided parallel to the extension-side damping valve in order to permit only a flow traveling from the switching device toward the extension-side chamber, and the contraction-side damping element comprises:

a contraction-side damping valve that applies resistance to a flow traveling from the contraction-side chamber toward the switching device; and a contraction-side check valve provided parallel to the contraction-side damping valve in order to permit only a flow traveling from the switching device toward the contraction-side chamber.

12. The suspension device as defined in claim 11, wherein the extension-side damping element comprises:

an extension-side bypass passage provided parallel to the extension-side damping valve; and a second extension-side damping valve and an extension-side open/close valve provided in the extension-side bypass passage, and the extension-side open/close valve closes the extension-side bypass passage when a pressure in the supply passage is lower than a predetermined value, and opens the extension-side bypass passage when the pressure in the supply passage equals or exceeds the predetermined value.

13. The suspension device as defined in claim 11, wherein the contraction-side damping element comprises:

a contraction-side bypass passage provided parallel to the contraction-side damping valve; and a second contraction-side damping valve and a contraction-side open/close valve provided in the contraction-side bypass passage, and the contraction-side open/close valve closes the contraction-side bypass passage when a pressure in the supply passage is lower than a predetermined value, and opens the contraction-side bypass passage when the pressure in the supply passage equals or exceeds the predetermined value.

14. The suspension device defined in claim 2, wherein the switching device is a direction switching valve, the direction switching valve includes:

an extension-side supply position in which the supply passage is connected to the extension-side passage and the discharge passage is connected to the contraction-side passage;

a contraction-side supply position in which the supply passage is connected to the contraction-side passage and the discharge passage is connected to the extension-side passage; and a communication position in which the supply passage, the discharge passage, the extension-side passage, and the contraction-side passage all communicate with each other.

15. The suspension device defined in claim 2, wherein the control valve is a solenoid throttle valve controlled on the basis of a pressure in the supply passage, which is detected by a pressure sensor.

16. The suspension device defined in claim 2, wherein the damper includes a rod that is inserted into the cylinder to be free to move and coupled to the piston.

* * * * *